United States Patent
Ota et al.

(10) Patent No.: US 6,404,508 B1
(45) Date of Patent: Jun. 11, 2002

(54) GRADATION REPRODUCTION

(75) Inventors: Ken Ota, Sunnyvale, CA (US); Shinichi Takemoto, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/037,989

(22) Filed: Mar. 11, 1998

(30) Foreign Application Priority Data

Mar. 12, 1997 (JP) ............................................. 9-057675
Mar. 12, 1997 (JP) ............................................. 9-057676

(51) Int. Cl.⁷ .......................... H04N 1/405; H04N 1/52; G06K 15/02
(52) U.S. Cl. ...................... 358/1.9; 358/3.09; 358/3.13; 358/3.2; 358/3.26; 358/533; 358/535; 358/536
(58) Field of Search ........................ 358/1.9, 533, 534, 358/535, 536, 454, 456, 457, 458, 459, 298

(56) References Cited

U.S. PATENT DOCUMENTS

| | | | |
|---|---|---|---|
| 4,342,051 A | | 7/1982 | Suzuki et al. |
| 4,517,606 A | | 5/1985 | Yokomizo et al. |
| 4,903,123 A | * | 2/1990 | Kawamura et al. ......... 358/533 |
| 4,967,211 A | | 10/1990 | Colby et al. |
| 5,041,920 A | | 8/1991 | Hayes et al. |
| 5,099,259 A | | 3/1992 | Hirahara et al. |
| 5,258,780 A | | 11/1993 | Ema et al. ................... 358/298 |
| 5,270,827 A | | 12/1993 | Kobayashi et al. ......... 358/298 |
| 5,901,275 A | * | 5/1999 | Broddin et al. .............. 358/1.9 |

FOREIGN PATENT DOCUMENTS

| | | | |
|---|---|---|---|
| EP | 0 847 188 A2 | * 6/1998 | .......... H04N/1/405 |
| JP | 7-115538 | 5/1995 | |

OTHER PUBLICATIONS

Halftone Reproduction on Gigital Color Printer Based on Electrophotograph (III); Naoto Kawamura et al.; Nov. 22, 1985; pp. 31–44.

* cited by examiner

*Primary Examiner*—Scott Rogers
(74) *Attorney, Agent, or Firm*—Burns, Doane, Swecker & Mathis, LLP

(57) ABSTRACT

In order to reproduce a gradation image of a plurality of colors with dither method, a plurality of patterns including first and second patterns are provided which makes dot in the reproduced image grow as lines and as lumps as gradation level increases with increase in gradation level. One of the patterns for a color of the received image data is selected, and received multi-level image data are screened with the selected pattern to generate bi-level image data for reproducing the image. In a different way, a plurality of patterns including first and second patterns are provided which make dots to be reproduced grow discretely along lines at low gradation levels as the gradation level increases. Screen angles of the first and second patterns are different by 90° from each other. One of the patterns is selected based on a color of received image data, and the received image data are screened with the selected patterns to generate bi-level image data. Thus, color shift or color nonuniformity in the reproduced image is suppressed, and image quality of full-color or multi-color reproduction image is improved.

20 Claims, 29 Drawing Sheets

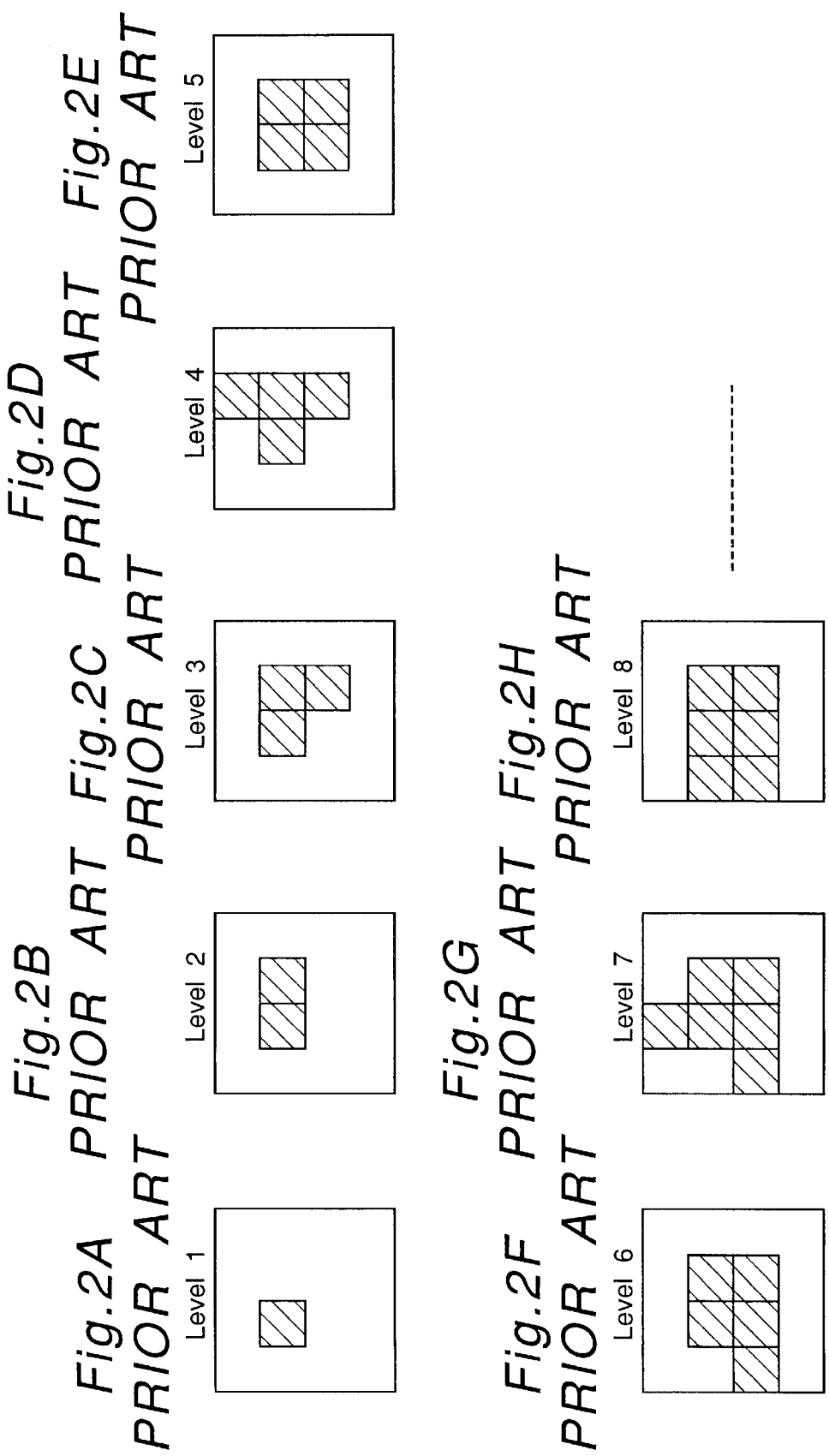

Black

Magenta

Black and magenta

Black and magenta

○ ---- First color
△ ---- Second color

Fig.9

PSGK

| 32 | 28 | 10 | 14 | 15 | 22 | 25 | 29 |
|----|----|----|----|----|----|----|----|
| 24 | 17 | 1  | 2  | 3  | 4  | 11 | 20 |
| 19 | 9  | 8  | 7  | 6  | 5  | 18 | 23 |
| 31 | 27 | 21 | 16 | 13 | 12 | 26 | 30 |

Fig.10

PSGM

| 28 | 32 | 4 | 8 | 12 | 16 | 20 | 24 |
|----|----|---|---|----|----|----|----|
| 25 | 29 | 1 | 5 | 9  | 13 | 17 | 21 |
| 26 | 30 | 2 | 6 | 10 | 14 | 18 | 22 |
| 27 | 31 | 3 | 7 | 11 | 15 | 19 | 23 |

Fig.11

|    |    |    |    |    |    |    |    |    |    |    |    |    |    |    |    | PSGY |    |    |    |
|----|----|----|----|----|----|----|----|----|----|----|----|----|----|----|----|----|----|----|----|
| 19 | 15 | 11 | 14 | 17 | 20 | 12 | 9  | 8  | 7  | 6  | 5  | 18 | 16 | 1  | 2  | 3  | 4  | 10 | 13 |
| 1  | 2  | 3  | 4  | 10 | 13 | 19 | 15 | 11 | 14 | 17 | 20 | 12 | 9  | 8  | 7  | 6  | 5  | 18 | 16 |
| 8  | 7  | 6  | 5  | 18 | 16 | 1  | 2  | 3  | 4  | 10 | 13 | 19 | 15 | 11 | 14 | 17 | 20 | 12 | 9  |
| 11 | 14 | 17 | 20 | 12 | 9  | 8  | 7  | 6  | 5  | 18 | 16 | 1  | 2  | 3  | 4  | 10 | 13 | 19 | 15 |
| 3  | 4  | 10 | 13 | 19 | 15 | 11 | 14 | 17 | 20 | 12 | 9  | 8  | 7  | 6  | 5  | 18 | 16 | 1  | 2  |
| 6  | 5  | 18 | 16 | 1  | 2  | 3  | 4  | 10 | 13 | 19 | 15 | 11 | 14 | 17 | 20 | 12 | 9  | 8  | 7  |
| 17 | 20 | 12 | 9  | 8  | 7  | 6  | 5  | 18 | 16 | 1  | 2  | 3  | 4  | 10 | 13 | 19 | 15 | 11 | 14 |
| 10 | 13 | 19 | 15 | 11 | 14 | 17 | 20 | 12 | 9  | 8  | 7  | 6  | 5  | 18 | 16 | 1  | 2  | 3  | 4  |
| 18 | 16 | 1  | 2  | 3  | 4  | 10 | 13 | 19 | 15 | 11 | 14 | 17 | 20 | 12 | 9  | 8  | 7  | 6  | 5  |
| 12 | 9  | 8  | 7  | 6  | 5  | 18 | 16 | 1  | 2  | 3  | 4  | 10 | 13 | 19 | 15 | 11 | 14 | 17 | 20 |

Fig.12

PSGC

| 20 | 17 | 14 | 11 | 15 | 19 | 13 | 10 | 4 | 3 | 2 | 1 | 16 | 18 | 5 | 6 | 7 | 8 | 9 | 12 |
|---|---|---|---|---|---|---|---|---|---|---|---|---|---|---|---|---|---|---|---|
| 13 | 10 | 4 | 3 | 2 | 1 | 16 | 18 | 5 | 6 | 7 | 8 | 9 | 12 | 20 | 17 | 14 | 11 | 15 | 19 |
| 16 | 18 | 5 | 6 | 7 | 8 | 9 | 12 | 20 | 17 | 14 | 11 | 15 | 19 | 13 | 10 | 4 | 3 | 2 | 1 |
| 9 | 12 | 20 | 17 | 14 | 11 | 15 | 19 | 13 | 10 | 4 | 3 | 2 | 1 | 16 | 18 | 5 | 6 | 7 | 8 |
| 15 | 19 | 13 | 10 | 4 | 3 | 2 | 1 | 16 | 18 | 5 | 6 | 7 | 8 | 9 | 12 | 20 | 17 | 14 | 11 |
| 2 | 1 | 16 | 18 | 5 | 6 | 7 | 8 | 9 | 12 | 20 | 17 | 14 | 11 | 15 | 19 | 13 | 10 | 4 | 3 |
| 7 | 8 | 9 | 12 | 20 | 17 | 14 | 11 | 15 | 19 | 13 | 10 | 4 | 3 | 2 | 1 | 16 | 18 | 5 | 6 |
| 14 | 11 | 15 | 19 | 13 | 10 | 4 | 3 | 2 | 1 | 16 | 18 | 5 | 6 | 7 | 8 | 9 | 12 | 20 | 17 |
| 4 | 3 | 2 | 1 | 16 | 18 | 5 | 6 | 7 | 8 | 9 | 12 | 20 | 17 | 14 | 11 | 15 | 19 | 13 | 10 |
| 5 | 6 | 7 | 8 | 9 | 12 | 20 | 17 | 14 | 11 | 15 | 19 | 13 | 10 | 4 | 3 | 2 | 1 | 16 | 18 |

Fig.13

PSFK

| 32 | 28 | 10 | 14 | 15 | 22 | 25 | 29 |
|----|----|----|----|----|----|----|----|
| 24 | 17 | ■ | ■ | ■ | ■ | 11 | 20 |
| 19 | 9 | ■ | ■ | ■ | ■ | 19 | 23 |
| 31 | 27 | 21 | 16 | 13 | 12 | 26 | 30 |

Fig.14

PSFM

| 28 | 32 | ■ | ■ | 12 | 16 | 20 | 24 |
|----|----|----|----|----|----|----|----|
| 25 | 29 | ■ | ■ | 9 | 13 | 17 | 21 |
| 26 | 30 | ■ | ■ | 10 | 14 | 18 | 22 |
| 27 | 31 | ■ | ■ | 11 | 15 | 19 | 23 |

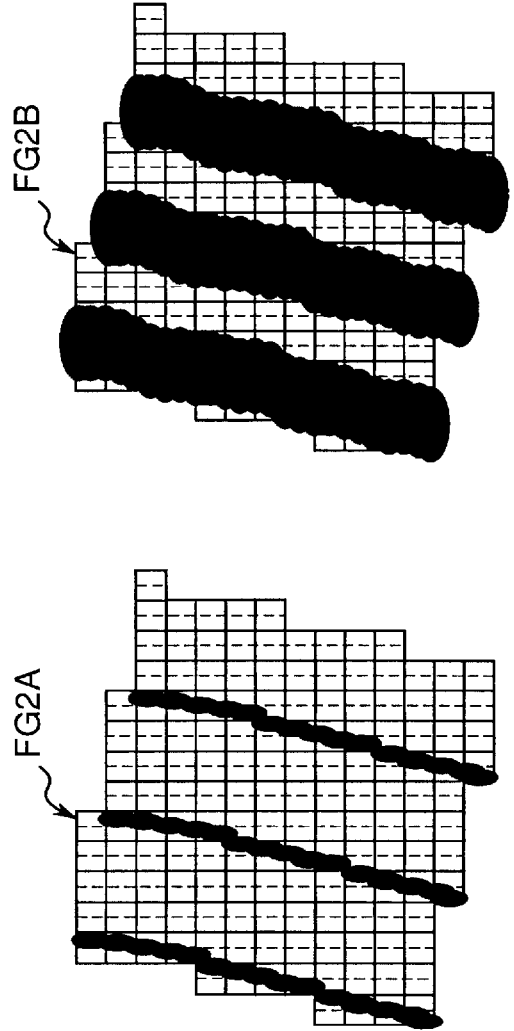
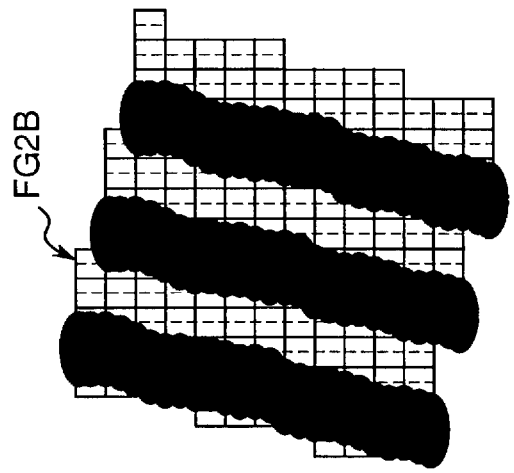
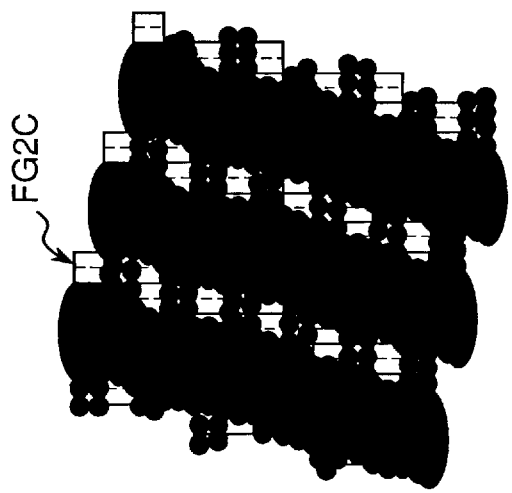

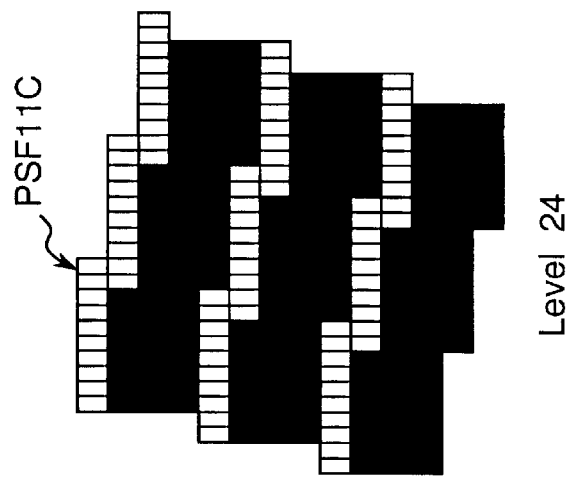
Fig.25C PRIOR ART — PSF11C — Level 24
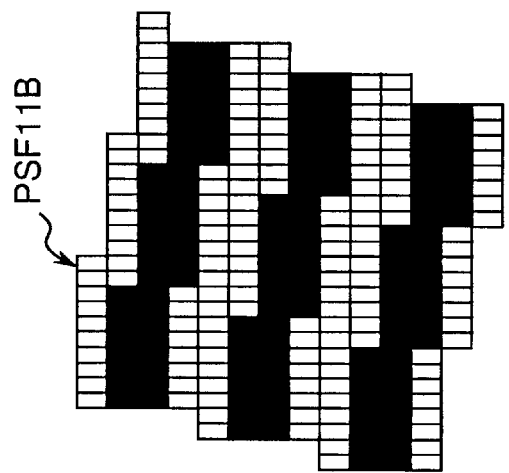
Fig.25B PRIOR ART — PSF11B — Level 16
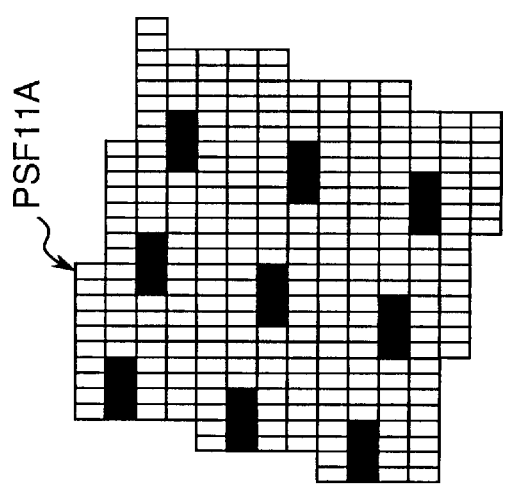
Fig.25A PRIOR ART — PSF11A — Level 4

Fig.30A PRIOR ART
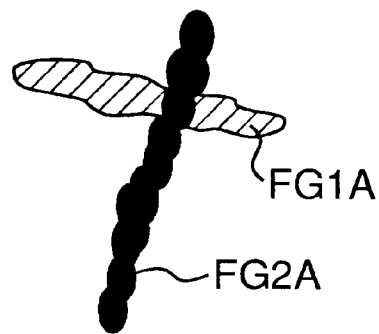
FG1A
FG2A
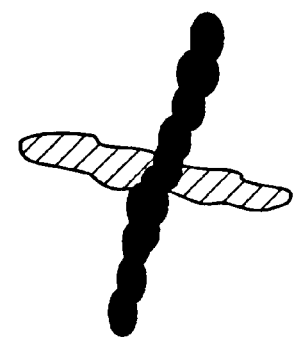
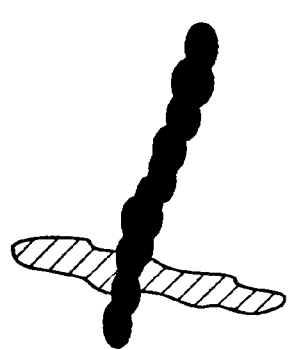
Fig.30B PRIOR ART
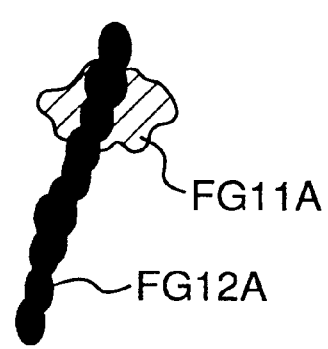
FG11A
FG12A
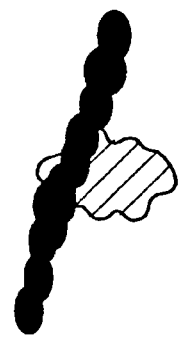
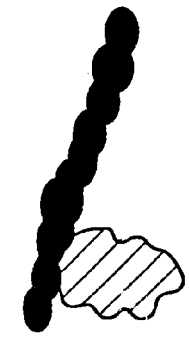

Fig.31A

PSG5

| 8 | 11 | 14 | 17 | 20 | 23 | 31 | 35 | 34 | 30 | 2 | 5 |
|---|----|----|----|----|----|----|----|----|----|---|---|
| 13 | 16 | 19 | 22 | 25 | 27 | 32 | 36 | 1 | 4 | 7 | 10 |
| 21 | 24 | 33 | 29 | 26 | 28 | 3 | 6 | 9 | 12 | 15 | 18 |
| 31 | 35 | 34 | 30 | 2 | 5 | 8 | 11 | 14 | 17 | 20 | 23 |
| 32 | 36 | 1 | 4 | 7 | 10 | 13 | 16 | 19 | 22 | 25 | 27 |
| 3 | 6 | 9 | 12 | 15 | 18 | 21 | 24 | 33 | 29 | 26 | 28 |

Fig.31B

PSF5

| | | 14 | 17 | 20 | 23 | 31 | 35 | 34 | 30 | | |
| --- | --- | --- | --- | --- | --- | --- | --- | --- | --- | --- | --- |
| 13 | 16 | 19 | 22 | 25 | 27 | 32 | 36 | | | | |
| 21 | 24 | 33 | 29 | 26 | 28 | | | | | 15 | 18 |
| 31 | 35 | 34 | 30 | | | | | 14 | 17 | 20 | 23 |
| 32 | 36 | | | | | 13 | 16 | 19 | 22 | 25 | 27 |
| | | | | 15 | 18 | 21 | 24 | 33 | 29 | 26 | 28 |

Fig.32A

PSG6

| 2 | 5 | 8 | 11 | 14 | 17 | 20 | 23 | 27 | 25 | 30 | 34 |
|---|---|---|---|---|---|---|---|---|---|---|---|
| 36 | 32 | 1 | 4 | 7 | 10 | 13 | 16 | 19 | 22 | 29 | 33 |
| 35 | 31 | 28 | 26 | 3 | 6 | 9 | 12 | 15 | 18 | 21 | 24 |
| 20 | 23 | 27 | 25 | 30 | 34 | 2 | 5 | 8 | 11 | 14 | 17 |
| 13 | 16 | 19 | 22 | 29 | 33 | 36 | 32 | 1 | 4 | 7 | 10 |
| 9 | 12 | 15 | 18 | 21 | 24 | 35 | 31 | 28 | 26 | 3 | 6 |

Fig.32B

PSF6

GRADATION REPRODUCTION

This application is based on applications Nos. 9-57675/1997 and 9-57676/1997 filed in Japan, the content of which is incorporated hereinto by reference.

BACKGROUND OF THE INVENTION

1. Field of the Invention

The present invention relates to a method for reproducing a gradation image and an image forming apparatus therefor.

2. Description of Prior Art

As personal computers become popular, electrophotographic full-color printers starts to gain popularity not only in business use but also in home use. In an electrophotographic printer, a dither method is generally used to reproduce a gradation image.

FIG. 1A illustrates the dither method. Referring to FIG. 1A, a density value of each pixel of inputted image data 81 is compared one to one with a threshold value of each corresponding element in a matrix MT11 which serves as a gradation pattern. When the density value of a pixel is greater than the threshold value of the corresponding element, a position corresponding to the element has a value "1". Otherwise, the position corresponding to the element has a value "0". As a result, a gradation pattern image 83 is obtained wherein black positions represent "1". It is to be noted that the density values (levels) of the image information 81 are all "4" in this example.

In the threshold value matrix MT11 shown in FIG. 1A, an image with 16 gradation levels can be reproduced. Further, if each element is halved, as shown in FIG. 1B, the number of the gradation levels can be increased twice by controlling a laser emission time.

In another dither method, as shown in FIGS. 2A through 2H, output patterns are prepared beforehand in correspondence to each density value as look-up tables (LUTs). when image data is received, an image is outputted by referring the density value thereof to the look-up table according.

For example, if an image is formed with either of the above-mentioned dither methods by using the same threshold value matrix MT, images of two colors of black and magenta shown in FIGS. 3A and 3B are superposed on each other. However, there may be nonuniformity in distance between outputted dots or a change in the printing position due to the influence of pitch irregularity or the like caused by rotational irregularity of the photoconductor or the like for electrophotographic process. In such case, dots of the two colors are liable to be completely superimposed on each other, as shown in FIG. 3C or to be arranged in parallel to each other as shown in FIG. 3D. The resulting color becomes blackish in FIG. 3C, and it becomes reddish in FIG. 3D. Therefore, when even an image having a uniform density distribution is printed, a nonuniform color image is formed due to the nonuniformity in the overlap state of the dots.

Therefore, in order to prevent color nonuniformity, the overlap state of the dots is proposed to be dispersed. That is, a gradation pattern (referred to also as density pattern or exposure pattern) is prepared for each color component to change the screen angle of the gradation pattern for each color component.

For example, a unit threshold value matrix MT13 shown in FIG. 4A is used in the dither method, and it is arranged so as to be displaced in the longitudinal direction and in the transverse direction, to form a gradation pattern with a particular screen angle. In the gradation pattern shown in FIG. 4B, the unit threshold value matrices MT13 are arranged so as to be displaced in the rightward direction by "a" pixels, or four pixels in this example, and in the downward direction by "b" pixels, or one pixel in this example. Therefore, $$\tan\theta_1 \approx 1/4,$$

and this means that the screen angle $\theta_1$ is about 14 degrees. On the other hand, the gradation pattern shown in FIG. 4B is also equivalent to an arrangement in which the unit threshold value matrices MT13 shown in FIG. 4A are displaced by one pixel in the leftward direction and four pixels in the downward direction. Therefore, $$\tan\theta_2 = 4/1,$$

and this means that the screen angle $\theta_2$ is about 104 degrees. That is, the gradation pattern has two screen angles $\theta_1$ and $\theta_2$ different from each other by 90 degrees.

The resolution (the number of lines) of the image outputted by using the gradation pattern is determined so as to be in inverse proportion to a length c (unit: pixel) of a line segment which connects the centers of adjacent unit threshold value matrices MT13 and to be approximately identical for each colors. Therefore, the resolution is expressed by c in the present specification.

If a difference in screen angle is small between arbitrary two gradation patterns corresponding to each color, a texture (rosette) becomes conspicuous as shown in, for example, FIG. 5 wherein circles represent first color and triangles represent second color. Therefore, it is required to set the difference in screen angle between two colors as large as possible.

However, it is a problem that the number of elements in the threshold value matrix as a unit is limited to a number not greater than a predetermined number. Therefore, the screen angle which can be set is limited to a limited number of discrete values. Furthermore, if the resolution is increased, the number of the elements is further limited, and the value of the screen angle that can be set is further limited.

Furthermore, as described above, the gradation pattern PSG has two screen angles $\theta_1$ and $\theta_2$ different from each other by 90 degrees. Therefore, the screen angles that can be set for the gradation patterns for the color components are further limited.

Then, even if screen angles for the color components are varied between gradation patterns, the difference in screen angle between them cannot be increased so largely. Normally, in order to suppress color nonuniformity, it is desirable to set the difference in screen angle not smaller than 20 degrees between gradation patterns. However, when a full color is reproduced with four colors of yellow, magenta, cyan and black, the angle is insufficient. For this reason, the occurrence of color shift or color nonuniformity cannot be sufficiently suppressed or a ring-like texture (rosette) is liable to occur periodically, to degrade the image quality.

SUMMARY OF THE INVENTION

An object of the present invention is to provide a gradation reproducing method and an image reproduction apparatus capable of suppressing color shift or color nonuniformity and forming a color image or a multi-color image of which the texture is less noticeable.

In one aspect of the invention, in order to reproduce a gradation image of a plurality of colors, a plurality of patterns including first and second patterns are provided. The first pattern makes dots in the reproduced image grow as lines as gradation level increases, and the second pattern makes the dots in the reproduced image grow as lumps as gradation level increases. One of patterns for a color of the received image data is selected, and received multi-level image data are screened with the selected pattern to generate bi-level image data. The image can be reproduced with dots according to the bi-level image data.

In a second aspect of the invention, in order to reproduce a gradation image of a plurality of colors, a plurality of patterns including first and second patterns are provided, and the first and second patterns make dots to be reproduced grow discretely along lines at low gradation levels as the gradation level increases. Screen angles of the first and second patterns are different by 90° from each other. One of the patterns is selected based on a color of received image data, and the received image data are screened with the selected patterns to generate bi-level image data for reproducing the image with dots.

An advantage of the invention is that image quality of a full-color or multi-color reproduction image is improved by suppressing color shift or color nonuniformity.

Another advantage of the invention is that even when a printing position displacement occurs, the simultaneous collapsing of spaces is hard to occur.

A third advantage of the invention is that an image is reproduced stably.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 2A, 2B, 2C, 2D, 2E, 2F, 2G and 2H are diagrams of look-up table examples;

FIG. 9 is a diagram of a gradation pattern example;

FIG. 10 is a diagram of a gradation pattern example;

FIG. 11 is a diagram of a gradation pattern example;

FIG. 12 is a diagram of a gradation pattern example;

FIG. 13 is a diagram of a gradation pattern image example;

FIG. 14 is a diagram of a gradation pattern image example;

FIGS. 23A, 23B and 23C are diagrams of output images when printed by the gradation pattern images of FIGS. 22A, 22B and 22C.

FIGS. 25A, 25B and 25C are diagrams of gradation pattern image examples according to the gradation pattern of FIG. 24;

FIGS. 30A and 30B are diagrams for comparing the gradation pattern of the embodiment with a prior art gradation pattern;

FIGS. 31A and 31B are diagrams of a gradation pattern example and a gradation pattern image according to the pattern of another example of the embodiment; and FIGS. 32A and 32B are diagrams of a gradation pattern example and a gradation pattern image according to the pattern of another example of the embodiment.

DETAILED DESCRIPTION OF THE PREFERRED EMBODIMENTS

Figure 6:
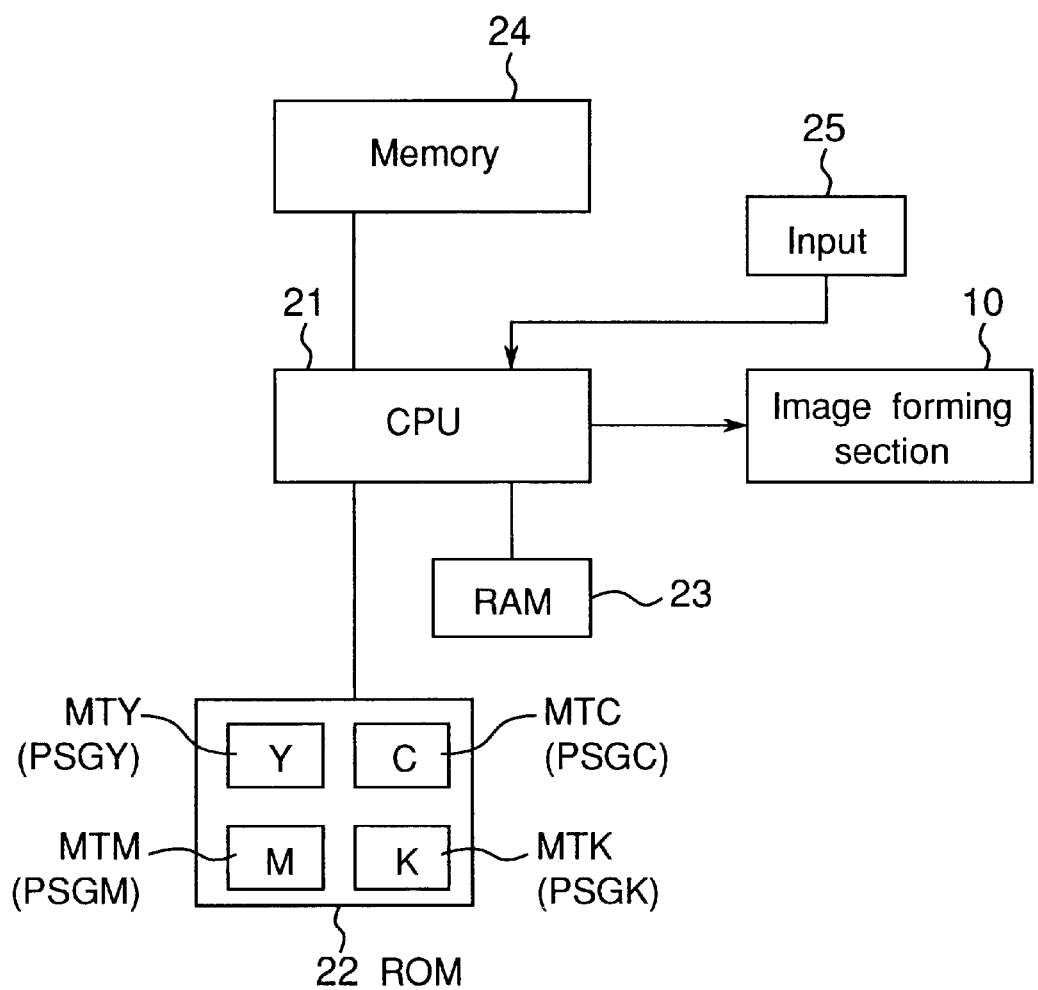
FIG. 6 is a block diagram of a full-color image forming apparatus.

Referring now to the drawings, wherein like reference characters designate like or corresponding parts throughout the several views, FIG. 6 shows a full-color image forming apparatus according to a first embodiment of the present invention. The image forming apparatus has an image forming section 10 for forming a full-color image by the electrophotographic process, a central processing unit (CPU) 21 for controlling the whole apparatus, a read only memory (ROM) 22, a random access memory (RAM) 23 used as a working area, a memory 24 for temporarily storing inputted image data, and an input section 25. The ROM 22 stores a control program, four threshold value matrices or dither matrices MT for binarization by the dither method. The threshold value matrices MT are provided for the four color components of Y (yellow), M (magenta), C (cyan) and K (black), and they are sometimes referred to as threshold value matrices MTY, MTM, MTC and MTK. These threshold value matrices MTY, MTM, MTC and MTK are also gradation patterns for screening the image data with threshold values.

Figure 7:
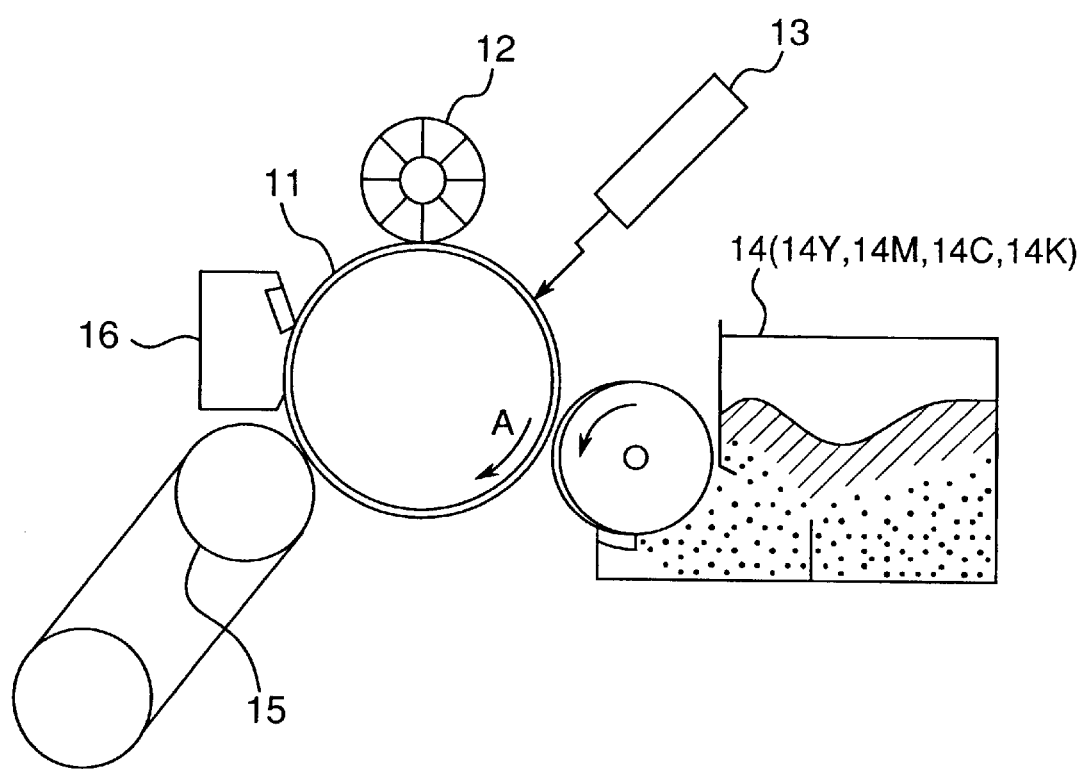
FIG. 7 is a sectional view of an image forming section.

In FIG. 7, the image forming section 10 has a photoconductor 11 which serves as an image carrier whose surface is coated with an organic photoconductive material and is able to be rotated in the direction of arrow "A". Around the photoconductor 11 are provided a charging brush 12, a laser exposure unit 13, a developing unit 14, an intermediate transfer member 15 and a cleaner unit 16, and they are arranged along a direction in which the photoconductor 11 is rotated.

The surface of the photoreceptor 11 is charged with a specified electric potential by electric discharge with the charging brush 12, and a laser beam is emitted to the photoconductor 11 by the laser exposure unit 13 according to image information, thereby forming an electrostatic latent image on the photoconductor. The electrostatic latent image is developed as a toner image by the developing unit 14.

The developing unit 14 has developing sections 14Y, 14M, 14C and 14K provided with toners of the four colors of Y, M, C and K. The electrostatic latent images formed on the photoconductor 11 are successively developed with toners of the four colors by these developing sections 14Y, 14M, 14C and 14K. Every time the latent image is developed, its toner image is transferred onto the intermediate transfer member 15. Consequently, the toner images of the four colors are superposed on each other on the intermediate transfer member 15, to form a full-color toner image.

The toner image formed at the intermediate transfer member 15 is transcribed onto a paper sheet (not shown) and thermally fixed by a fixing unit (not shown), to form a full-color image on the paper sheet. Toners remaining on the photoconductor 11 are collected by the cleaner unit 16.

Figure 8:
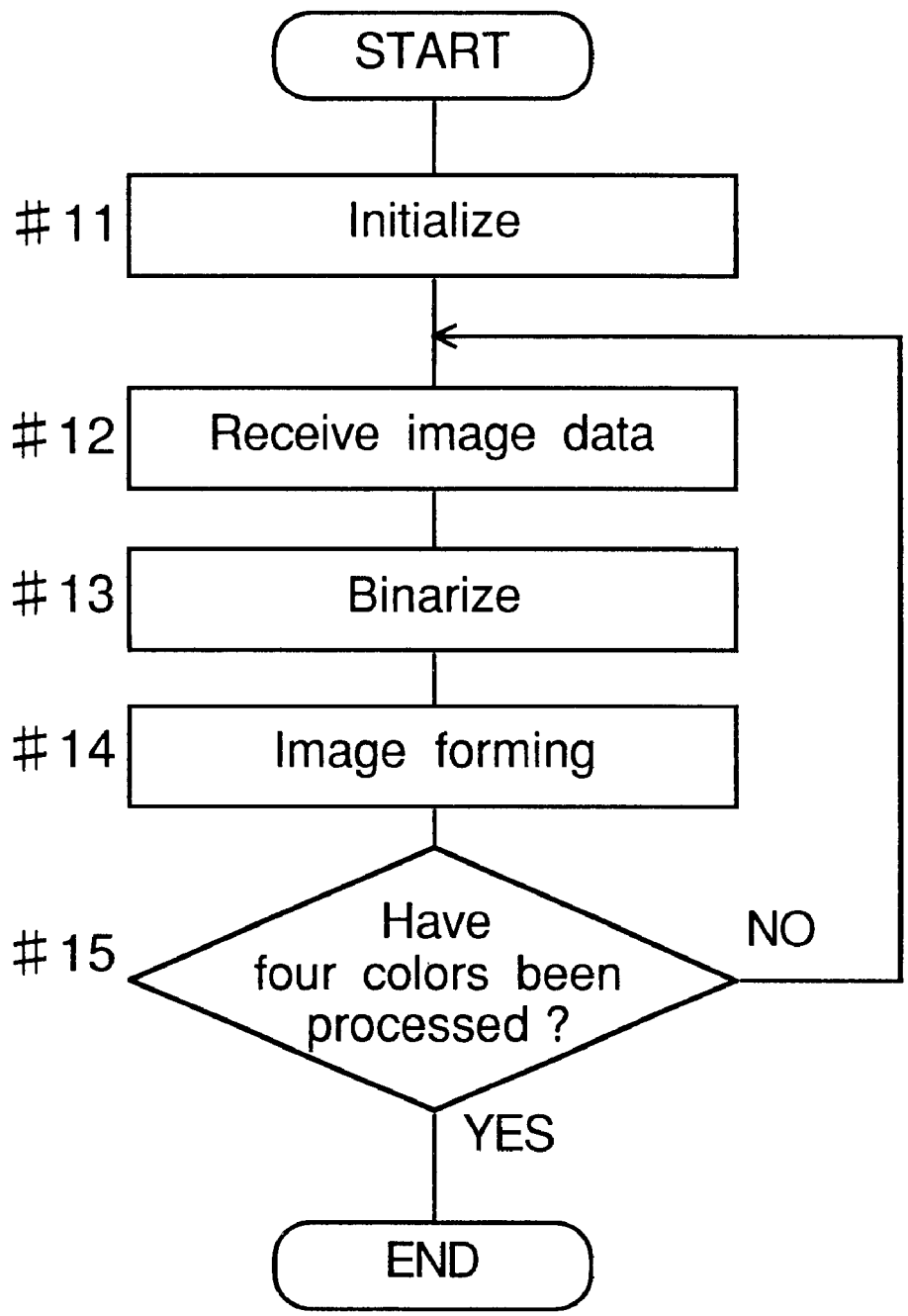
FIG. 8 is a flowchart of a control executed by a CPU.
Figure 15:
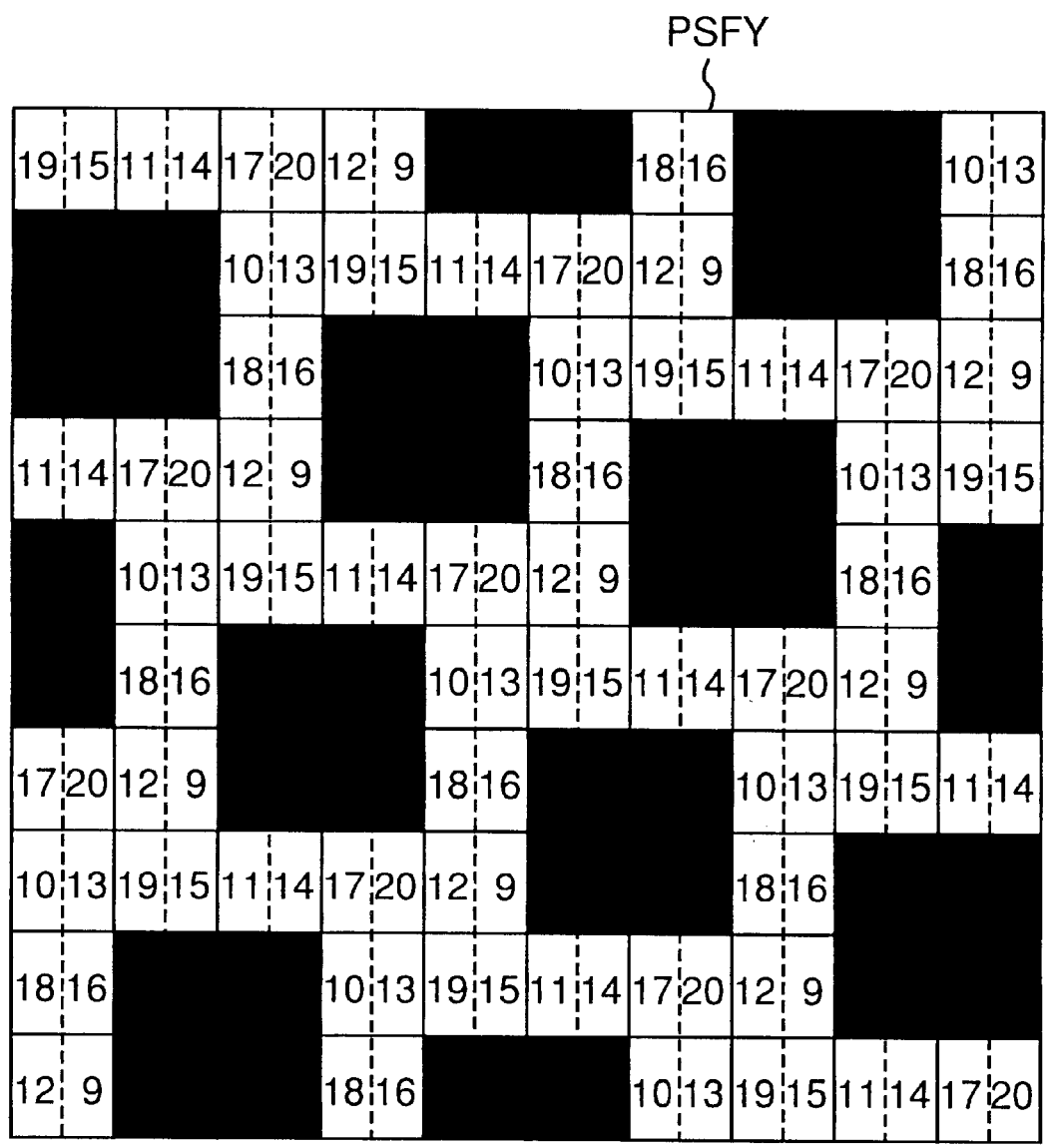
FIG. 15 is a diagram of a gradation pattern image example.
Figure 16:
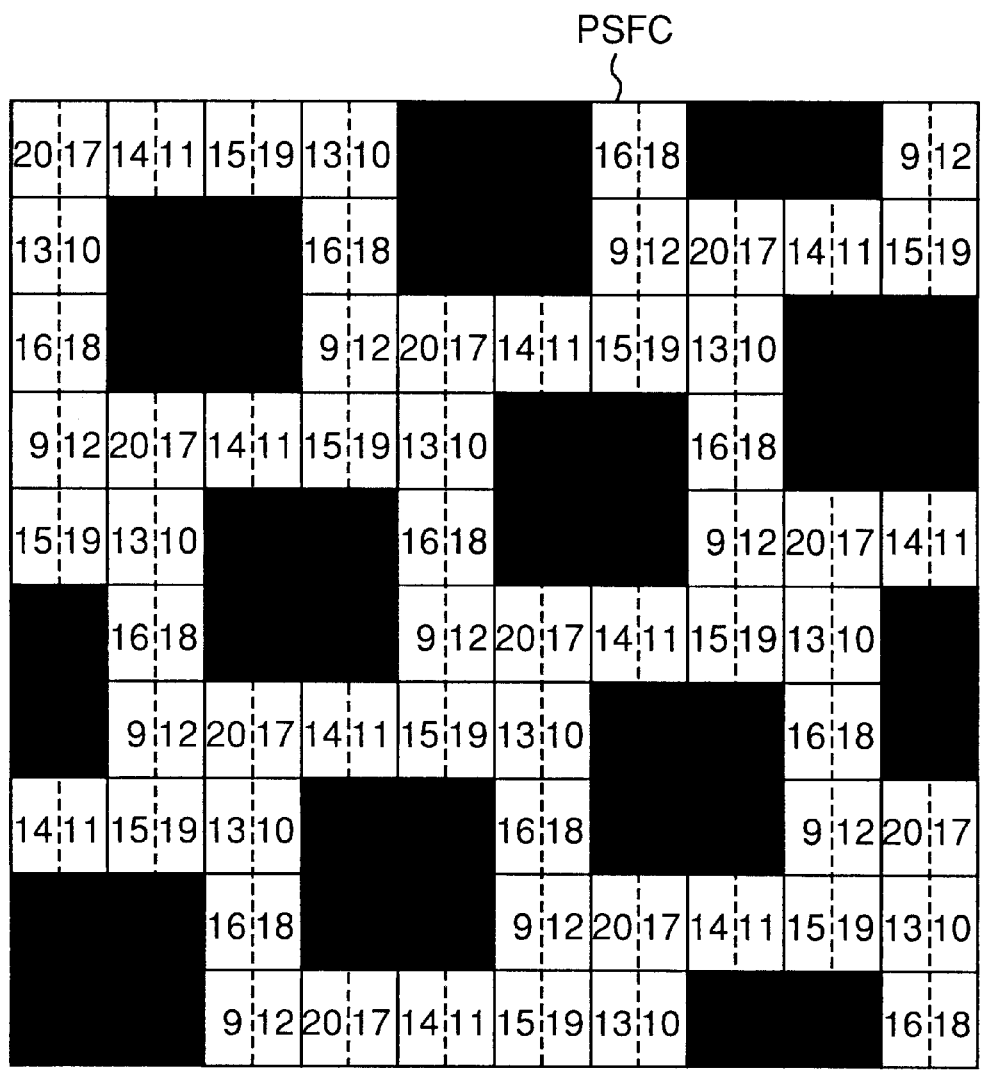
FIG. 16 is a diagram of a gradation pattern image example.

FIG. 8 is a main flowchart of a control executed by the CPU 21. First, the whole system is initialized (#11). Then image data corresponding to one color component is received from the memory 24 (#12). This image data is, for example, 64-level or 256-level gradation data. The image data is compared with the threshold value matrix MT corresponding to the color component among the threshold value matrices MT stored in the ROM 22, and the image data is binarized by the dither method (#13). Then, the laser exposure unit 13 is controlled based on the binarized image data (gradation pattern image), thereby executing image forming (#14). Thus, a toner image of the color is formed at the image forming section 10. The steps subsequent to the step #12 are repeated for the four color components (#15). As described above, the toner images of all the four color components are formed, and they are combined with one another to form a full-color image.

In this embodiment, a plurality of gradation patterns including first and second patterns are provided for the dither method. The first pattern makes dots in the reproduced image grow as lines as gradation level increases, and the second pattern makes the dots in the reproduced image grow as lumps as gradation level increases. One of patterns for a color of the received image data is selected, and received multi-level image data are screened with the selected gradation pattern to generate bi-level image data. The image can be reproduced with dots according to the bi-level image data.

Figure 3A:
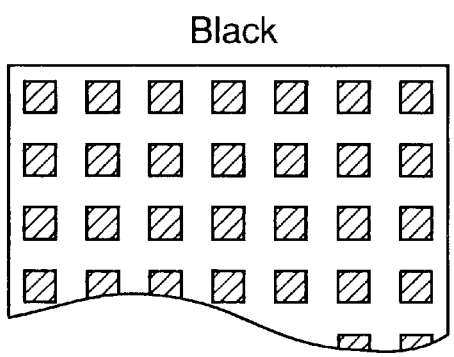
FIGS. 3A, 3B, 3C and 3D are diagrams of examples for illustrating overlap states of images of two colors.
Figure 3B:
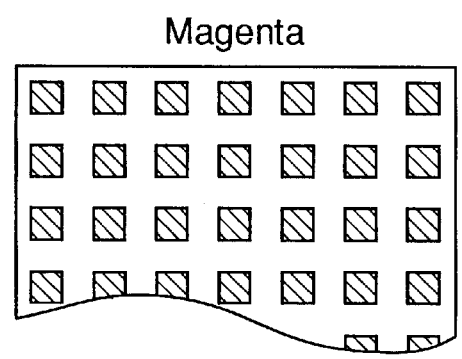
Figure 3C:
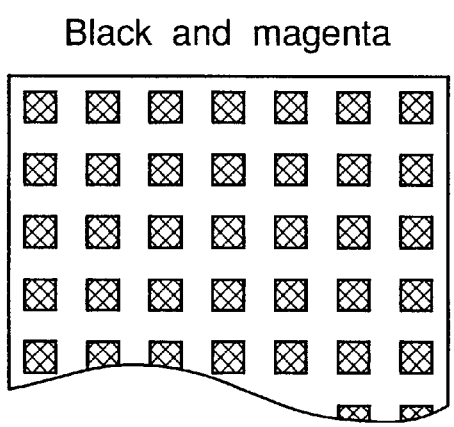
Figure 3D:
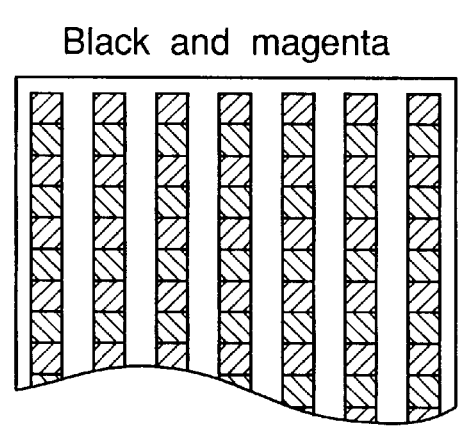
Figures 4A, 4B:
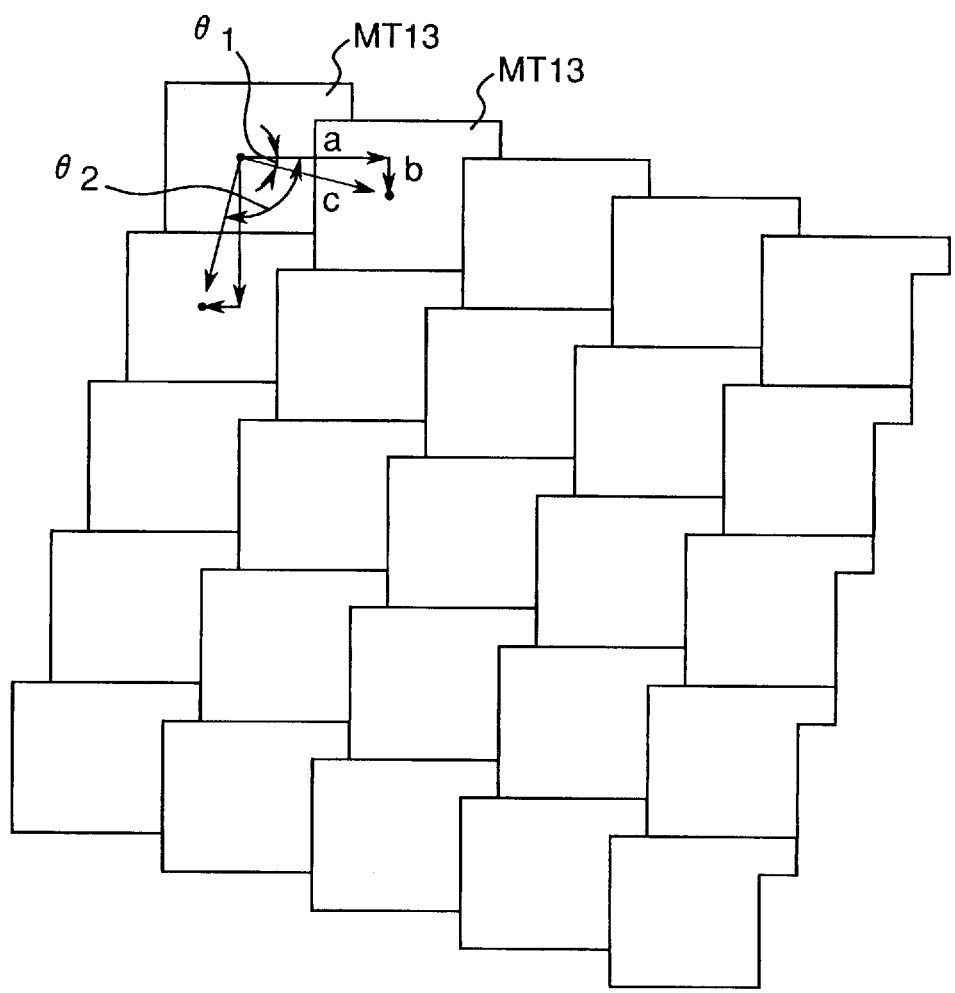
FIGS. 4A and 4B are diagrams for explaining the screen angle of a gradation pattern.
Figure 5:
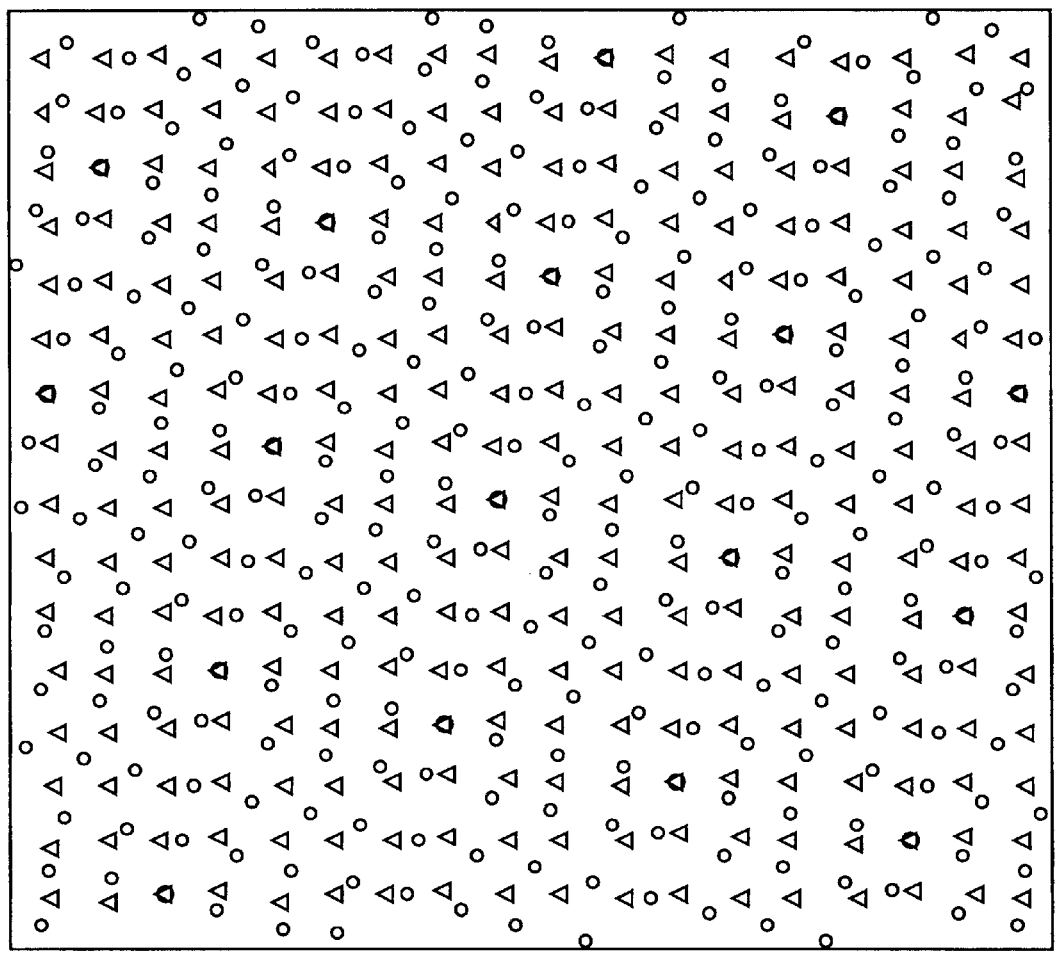
FIG. 5 is a diagram of a texture example.

Next, the threshold value matrices MTY, MTM, MTC and MTK stored in the ROM 22 will be described. Assuming that the same matrix is used for, for example, two threshold value matrices MTK and MTM among the four threshold value matrices MTY, MTM, MTC and MTK, then a color shift as shown in FIGS. 3C and 3D is liable to occur since the screen angles are equal to each other. In order to suppress the overlapping of dots, the screen angles are varied in the threshold value matrices MTY, MTM, MTC and MTK, thereby suppressing the color shift. In such cases, texture (rosette) becomes conspicuous when the difference in screen angle becomes small between two particular colors. Therefore, it is preferable to set the difference in screen angle between the two colors to an angle not smaller than 20 degrees. For example, for the threshold value matrix shown in FIG. 4B in which the resolution c has a value near to "4", the screen angle has values as indicated for eight cases from A through H in Table 1, and the screen angle is selected among them.

TABLE 1

| Gradation patterns for eight comparison cases | | | | | | | | |
|---|---|---|---|---|---|---|---|---|
| | A | B | C | D | E | F | G | H |
| a | 4 | 4 | 4 | 3 | 3 | 2 | 2 | 1 |
| b | 0 | 1 | 2 | 2 | 3 | 3 | 4 | 4 |
| c | 4 | 4.12 | 4.47 | 3.61 | 4.24 | 3.61 | 4.47 | 4.12 |
| $\theta_1$ | 0° | 14° | 27° | 34° | 45° | 56° | 63° | 76° |
| $\theta_2$ | 90° | 104° | 117° | 124° | 135° | 146° | 153° | 166° |

However, when gradation pattern images for the four colors of Y, M, C and K are all formed by the prior art method, the difference in screen angle is disadvantageously reduced between two colors if any screen angle combination for the four colors is selected among the cases A through H in Table 1. This is attributed to the aforementioned bidirectional property of the screen angle. Therefore, if the prior art method is used, the screen angles of the gradation pattern images of the four colors cannot be set so as to be different from one another by a value not smaller than 20 degrees, inevitably causing color shift or color nonuniformity.

Figure 1A:
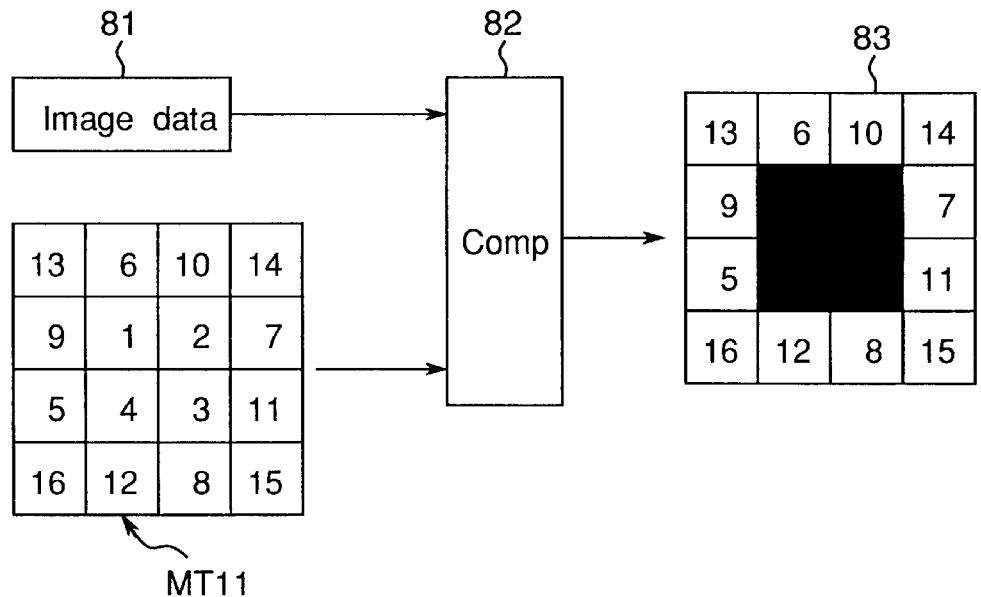
FIGS. 1A and 1B are block diagrams for explaining a dither method.
Figure 1B:
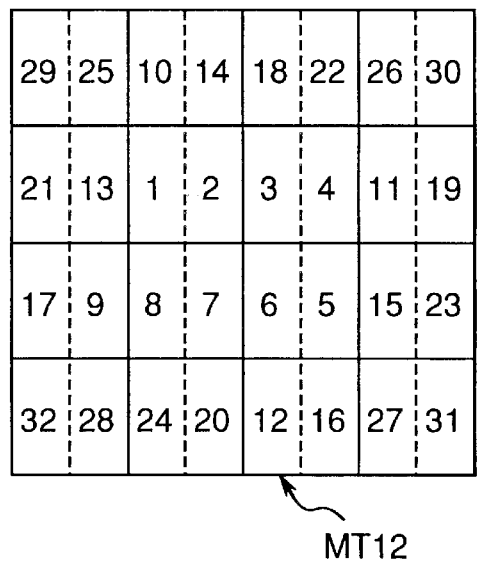

In view of the above, gradation patterns PSGK, PSGM, PSGY and PSGC shown in FIGS. 9, 10, 11 and 12 are used as the threshold value matrices MTK, MTM, MTY and MTC for the four colors of black, magenta, yellow and cyan. The size of the matrices is 4*8 similar to that shown in FIG. 1B. By using the gradation patterns PSGK, PSGM, PSGY and PSGC, gradation pattern images PSFK, PSFM, PSFY and PSFC shown in FIGS. 13, 14, 15 and 16 are obtained when the density value (level) of the image data is, for example, "8". The two matrices PSGK and PSGM correspond to the above-mentioned first and second gradation patterns, while the gradation patterns PSGY and PSGC correspond to the third and fourth patterns of the invention.

Among the four gradation patterns PSG, the two gradation patterns PSGK and PSGM shown in FIG. 9 and FIG. 10 have a screen angle of zero degree. The gradation pattern PSGK shown in FIG. 9 is a pattern in which a dot image becomes thicker in lump shapes from the center to the periphery as the gradation level increases gradually. That is, the threshold values "1" to "4" are arranged linearly around the center of the matrix, and following threshold values "5" to "8" are arranged adjacent to the line of "1" to "4" also around the center of the matrix. The threshold values larger than "8" are dispersed around the periphery of the matrix. Thus, by using the gradation pattern PSGK, a lump-shaped gradation pattern image PSFK as shown in FIG. 13 is obtained, and the gradation pattern PSGK makes dots in the reproduced image grow as lump shapes as the gradation level increases. The gradation pattern image PSFK is sometimes referred to as a lump-shaped gradation pattern image PSFK from the viewpoint of its lump-like shape.

The other gradation pattern PSGM shown in the FIG. 10 is a pattern in which a dot image grows in linear shapes (alternatively referred to as line shape or column shapes) in the vertical direction as the gradation level increases gradually, or as the gradation level increases in every eight gradation levels of the 32 gradation levels. That is, the threshold values "1" to "4" are arranged linearly across the matrix, following threshold values "5" to "8" are also arranged linearly adjacent to the line of "1" to "4" across the matrix, and so on. The threshold values larger than "26" are also arranged in a line across the matrix. The gradation pattern PSGM makes the dots in the reproduced image grow as line shapes as the gradation level increases. Thus, by using the gradation pattern PSGM, a line-shaped gradation pattern image PSFM as shown in FIG. 14 is obtained when the image has a low density. The gradation pattern image PSFM is sometimes referred to as a line-shaped gradation pattern image PSFM from the viewpoint of its linear shape.

Figure 17A:
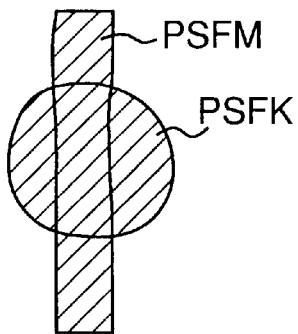
FIGS. 17A, 17B and 17C are diagrams of three cases where a line-shaped pattern image and a lump-shaped pattern image are superimposed on each other.
Figure 17B:
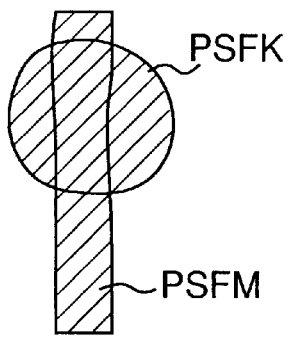
Figure 17C:
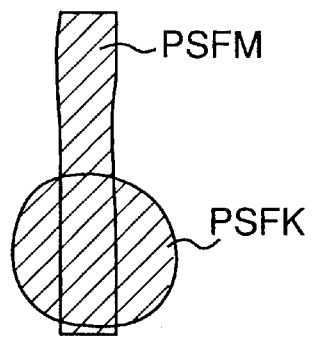

Images shown in FIGS. 17A through 17C are obtained when the gradation pattern images PSFK and PSFM shown in FIGS. 8 and 9 are superimposed on each other. FIG. 17A shows an image where the two gradation pattern images PSFK and PSFM are completely synchronized with each other, while FIGS. 17B and 17C show images where the positions of the gradation pattern images PSFK and PSFM are displaced from each other in the vertical direction.

As is understood from FIGS. 17A through 17C, there is no change in the overlap area whether the positions of both gradation pattern images PSFK and PSFM are synchronized with each other or relatively displaced in the vertical direction. That is, neither color shift nor color nonuniformity occurs due to the displacement in the vertical direction. Thus, even when the two gradation patterns PSGK and PSGM each having a screen angle of 0 degree are used, neither color shift nor color nonuniformity occurs.

It is to be noted that the displacement in the gradation pattern images PSF occurs almost in the subscan direction in which the paper sheet is driven, that is, in the vertical direction, but scarcely in the main scan direction. Therefore, it is practically sufficient to take the displacement in the vertical direction into consideration.

Because the screen angles of the two gradation patterns PSGK and PSGM are both zero degree, it is possible to make great differences in screen angle between them and the other two gradation patterns PSGY, PSGC, and between the two gradation patterns PSGY and PSGC. That is, the gradation pattern PSGY shown in FIG. 11 has a screen angle of about 30 degrees, and that the gradation pattern image PSFY shown in FIG. 15 can be obtained. The gradation pattern PSGC shown in FIG. 12 has a screen angle of about 60 degrees, and the gradation pattern image PSFC shown in FIG. 16 can be obtained.

By using the four gradation patterns PSGK, PSGM, PSGY and PSGC, the differences in screen angle become about 30 degrees, so that the occurrence of color shift or color nonuniformity can be suppressed. Further, a color image having a less conspicuous texture can be formed.

In the above-mentioned embodiment, the four gradation patterns PSGK, PSGM, PSGY and PSGC may be used for any of the color components. When a full-color image is formed with three colors, the gradation patterns PSG of any two colors may have a screen angle of zero degree and the gradation pattern PSG of the other one color may have a different screen angle. When the image to be formed is not a full-color one or when the image has, for example, two color components, the lump-shaped gradation pattern PSG and the line-shaped gradation pattern PSG may be used.

Although the above-mentioned embodiment has been described on the cases where the gradation patterns PSG are the threshold value matrices MT, look-up tables or density patterns may be used for the density pattern method alternatively. The size of the gradation pattern PSG, the arrangement of the threshold values and so on can be appropriately modified. The construction, shape, number, material and so on of the whole or part of the image forming section 10 or the image forming device may also be modified.

Next, a full-color image forming apparatus according to a second embodiment of the invention is explained. This embodiment is similar to the first embodiment except gradation reproduction which used different types of gradation patterns, and the gradation reproduction is explained below. In this embodiment, a plurality of gradation patterns including first and second patterns are provided, and the first and second patterns make dots to be reproduced grow discretely along lines at low gradation levels as the gradation level increases. Screen angles of the first and second patterns are different by 90° from each other.

Figure 18:
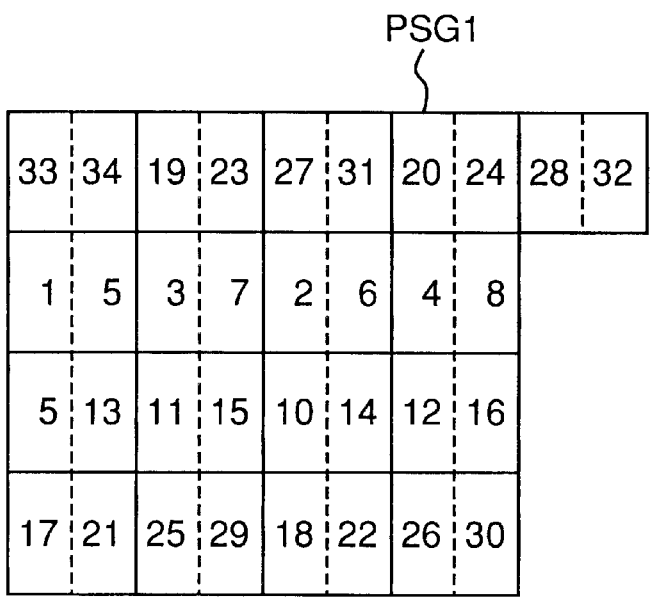
FIG. 18 is a diagram of a gradation pattern of the present invention.
Figure 19C:
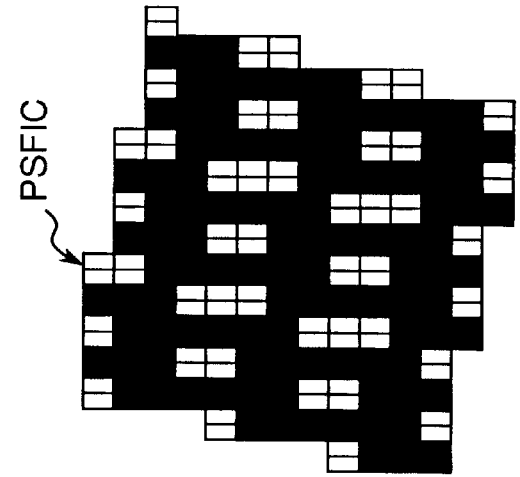
FIGS. 19A, 19B and 19C are diagrams of gradation pattern image examples according to the gradation pattern of FIG. 18.
Figure 19B:
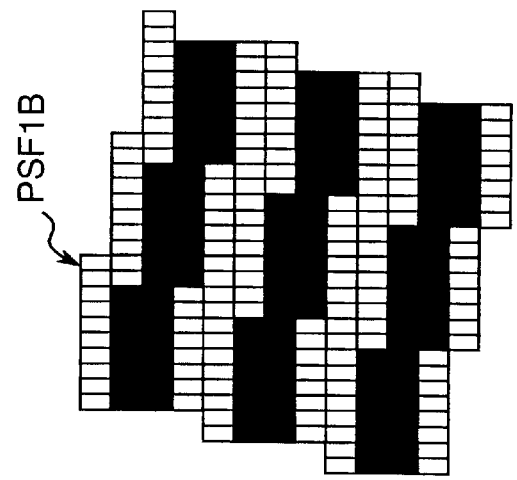
Figure 19A:
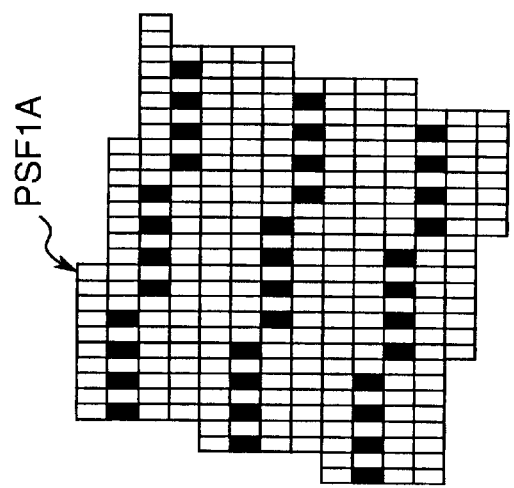
Figure 20A:
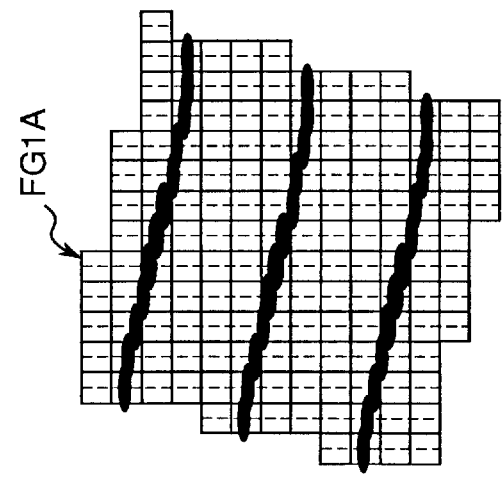
FIGS. 20A, 20B and 20C are diagrams of output images when printed by the gradation pattern images of FIGS. 19A to 19C.
Figure 20B:
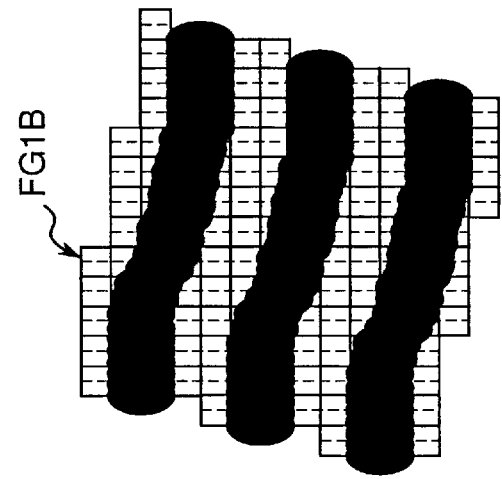
Figure 20C:
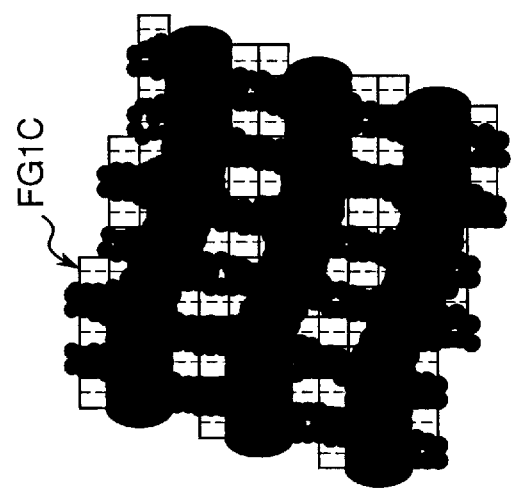
Figure 21:
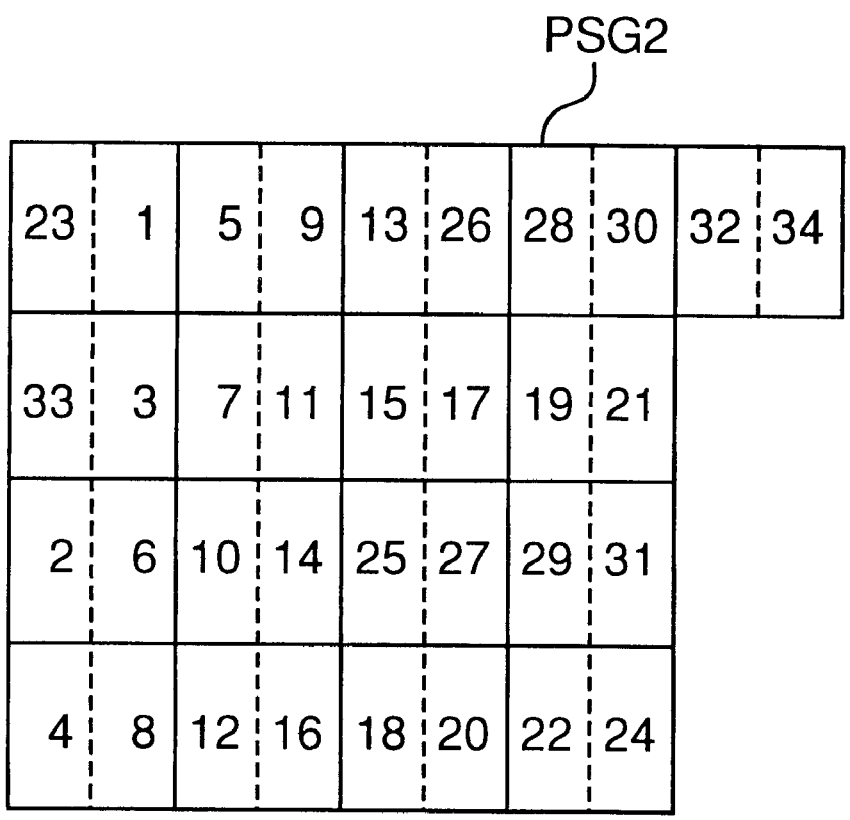
FIG. 21 is a diagram of another gradation pattern of the present invention.
Figure 22C:
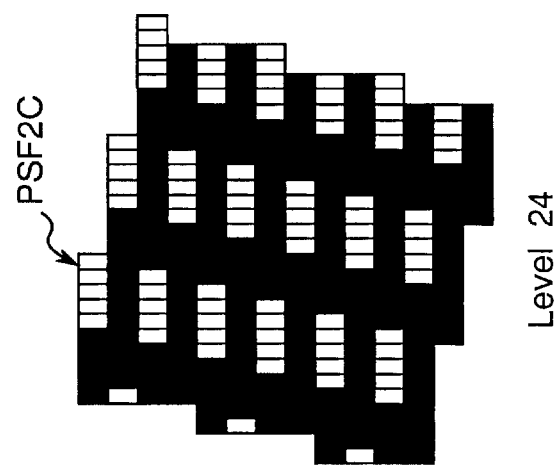
FIGS. 22A, 22B and 22C are diagrams of gradation pattern image examples according to the gradation pattern of FIG. 21.
Figure 22B:
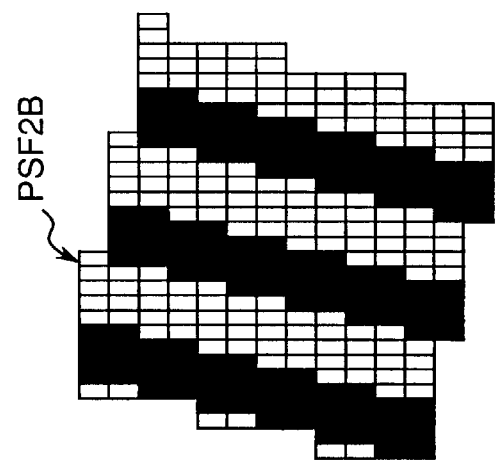
Figure 22A:
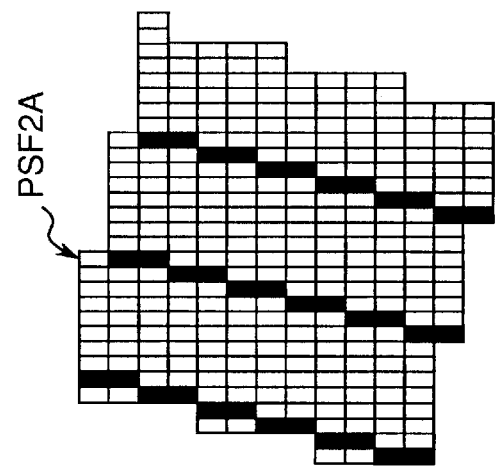

FIGS. 18 and 21 show gradation patterns (threshold value matrices) PSG1 and PSG2 used for two colors in the four colors, and the gradation patterns PSG1 and PSG2 corresponding to the above-mentioned first and second patterns. FIGS. 19A, 19B and 19C show examples of gradation pattern images PSF1A, PSF1B and PSF1C printed with the gradation pattern PSG1 shown in FIG. 18, and FIGS. 20A, 20B and 20C show output images FG1A, FG1B and FG1C printed with the gradation pattern images PSFLA, PSF1B and PSF1C shown in FIGS. 19A, 19B and 19C. On the other hand, FIGS. 22A, 22B and 22C show examples of the gradation pattern images PSF2A, PSF2B and PSF2C obtained with the gradation pattern PSG2 shown in FIG. 21, and FIGS. 23A, 23B and 23C show output images FG2A, FG2B and FG2C when printed with the gradation pattern images PSF2A, PSF2B and PSF2C shown in FIGS. 22A, 22B and 22C.

Figure 24:
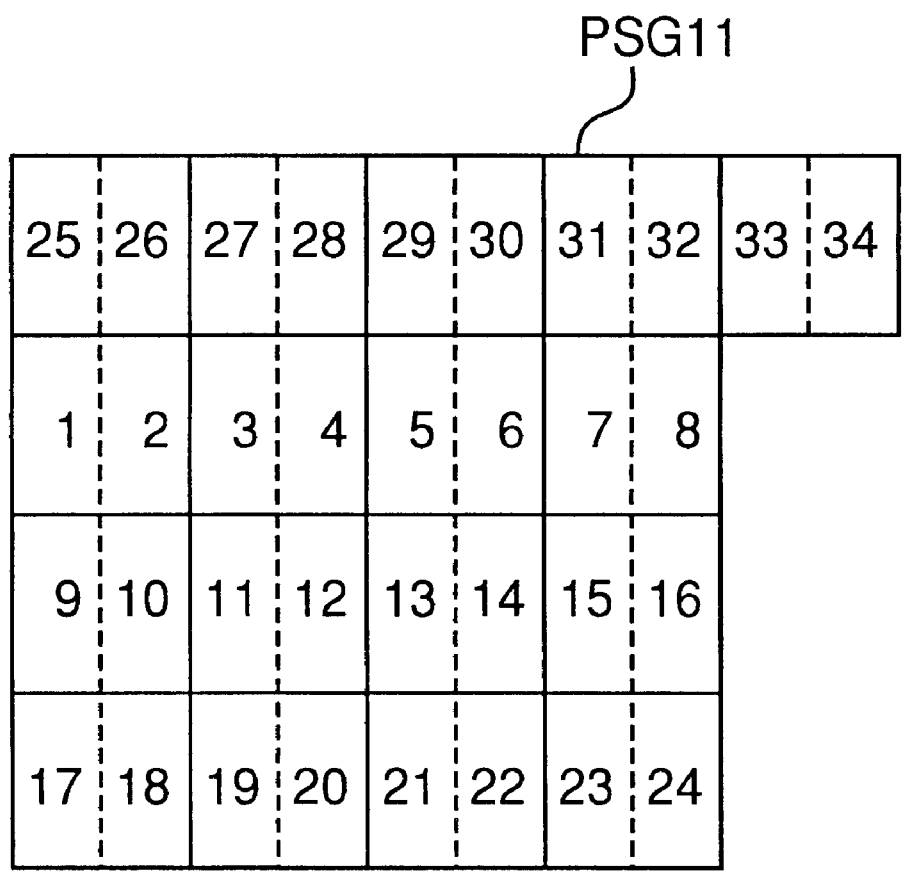
FIG. 24 is a diagram of a prior art gradation pattern displayed for comparison.

On the other hand, FIG. 24 shows a prior art gradation pattern PSG11 for comparison. FIGS. 25A, 25B and 25C show examples of the gradation pattern images PSF11A, PSF11B and PSF11C obtained with the gradation pattern PSG11 shown in FIG. 24, and FIGS. 26A, 26B and 26C show output images FG11A, FG11B and FG11C printed with the gradation pattern images PSF11A, PSF11B and PSF11C shown in FIGS. 25A, 25B and 25C. On the other hand, FIG. 27 shows another prior art gradation pattern PSG12. FIGS. 28A, 28B and 28C show examples of the gradation pattern images PSF12A, PSF12B and PSF12C obtained with the gradation pattern PSG12 shown in FIG. 27, and FIGS. 29A, 29B and 29C show output images FG12A, FG12B and FG12C when printed according to the gradation pattern images PSF12A, PSF12B and PSF12C shown in FIGS. 28A, 28B and 28C.

Further, FIGS. 30A and 30B shows output images for comparing the gradation patterns PSG1, PSG2 of this embodiment with the prior art gradation patterns PSG11, PSG12. Three gradation pattern images of each gradation pattern PSG show examples for image data having density levels of "4", "16" and "24", respectively.

The gradation patterns PSG1 and PSG2 have a unit of a size of 4*8 with two elements added at the top left side. As shown in FIGS. 19A–19C and 22A–22C, the units are arranged so as not to overlap each other at the two added elements. As to the pattern PSG1 shown in FIG. 18, in order to make dots to be reproduced grow discretely along lines and then linearly at low gradation levels as the gradation level increases, the values of "1" to "8" are arranged linearly across the matrix but dispersed in the line. Similarly, the values of "9" to "16" are also arranged linearly but dispersed adjacent to the line of "1" to "8". As the gradation level increases, the other pattern PSG2 shown in FIG. 21 makes dots to be reproduced grow first discretely along lines and then linearly at low gradation levels, and finally crossing the lines at high gradation levels remaining blank portions. That is, the values of "1" to "4" are arranged generally linearly in two skewed adjacent lines across the matrix but dispersed therein. Similarly, the values of "5" to "8", "9" to "12", "13" to "16" are also arranged linearly adjacent to each other. The values above "18" are arranged in a different way. The values from "19" to "24" are dispersed at perpendicular direction in two lines, and the values from "25" to "34" are dispersed similarly at perpendicular direction in two other lines to remain blank portions.

Next, the gradation reproduction is explained. First, by using the gradation pattern PSG1 shown in FIG. 18, in a low-density range, a dot pattern grow in linear shapes at screen angle of 14 degrees as the gradation level increases gradually as shown in FIG. 19A, and a plurality of dots appear discretely and periodically along lines as the dot pattern grows. In an intermediate-density range, a dot pattern extends continuously in linear shapes as shown in FIG. 19B. Further, in a high-density range, a plurality of blank portions having no dots appear discretely and periodically along the direction of the lines as shown in FIG. 19C.

Further, in the gradation pattern PSG1 shown in FIG. 18, the shortest distance between dot shapes that appear discretely is set so as to be shorter than a distance (which is the same as the resolution "c") between lines formed by the continued dots.

In spite of the fact that the gradation pattern image PSF1A shown in FIG. 19A is discrete, the output image FG1A shown in FIG. 20A appears continuously. The reason is that the exposed portions overlap each other due to the extension of the laser beam since the exposed positions by using the gradation pattern image PSF1A are located close to each other.

When the gradation pattern PSG2 shown in FIG. 21 is used, the growth process is similar to that for the gradation pattern PSG1 of dot pattern shown in FIG. 18, to result in gradation pattern images PSF shown in FIGS. 22A–22C and output images FG of screen angle of about 104 degrees shown in FIG. 23A–23C. There is a difference in screen angle of about 90 degrees between the gradation pattern image PSF2 obtained with the gradation pattern PSG2 (FIG. 21) and the gradation pattern image PSF1 obtained with the gradation pattern PSG1 (FIG. 18).

When output images FG1A and FG2A obtained with the two gradation patterns PSG1 and PSG2 are superimposed on each other, the output images FG1A and FG2A intersect each other at an angle of 90 degrees as shown in FIG. 30A. Since the overlap area is not changed even when their positions are displaced from each other, neither color shift nor color nonuniformity occurs. Furthermore, since the screen angles differ from each other by 90 degrees the difference between them is large, and no texture noise is generated.

On the contrary, according to the prior art gradation pattern PSG11 shown in FIG. 24, the gradation pattern image PSF11B shown in FIG. 25B is obtained at the density level of "16", and this is equivalent to the counterpart PSF1B shown in FIG. 19B. However, when the density level is as low as about "4", the dot-shaped gradation pattern image PSF11A is obtained as shown in FIG. 25A, by which the dot-shaped output image FG11A is obtained as shown in FIG. 26A. Thus, the prior art output image FG11A of dot-like shape is significantly different from the counterpart FG1A shown in FIG. 20A having linear shapes. Therefore, when the prior art output images FG11A and FG12A obtained at the low density level are superimposed on each other by using the two gradation patterns PSG11 and PSG12 shown in FIGS. 24 and 27, the overlapping area of the output images FG11A and FG12A varies when a displacement occurs, and therefore, color shift or color nonuniformity occurs.

Figure 26C:
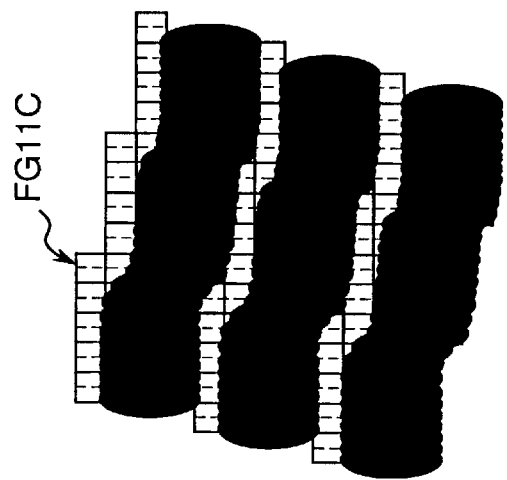
FIGS. 26A, 26B and 26C are diagrams of output images when printed by the gradation pattern images of FIGS. 25A, 25B and 25C.
Figure 26B:
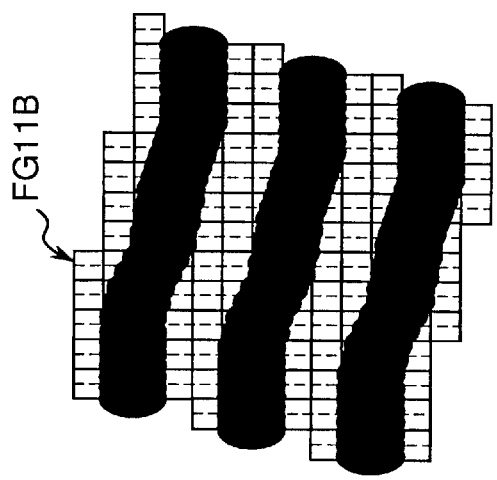
Figure 26A:
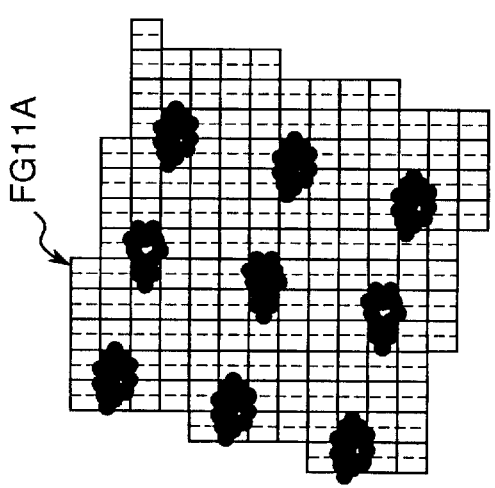
Figure 27:
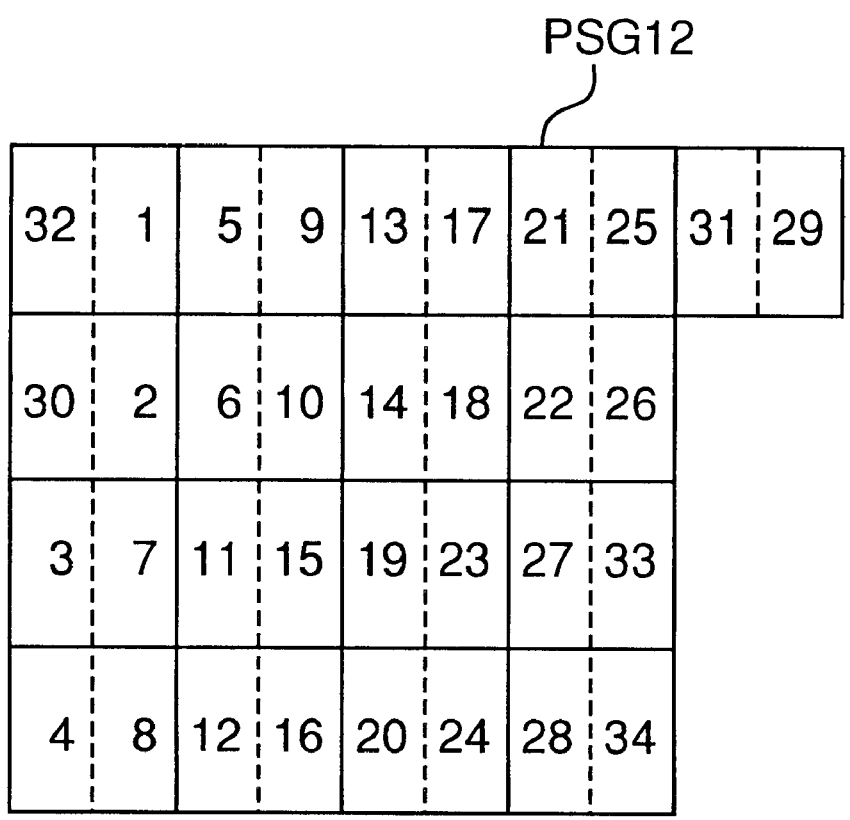
FIG. 27 is a diagram of another prior art gradation pattern.
Figure 28C:
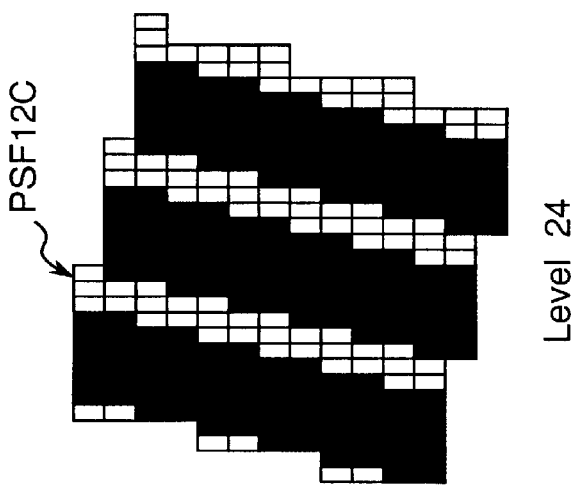
FIGS. 28A, 28B and 28C are diagrams of gradation pattern image examples according to the prior art gradation pattern of FIG. 27.
Figure 28B:
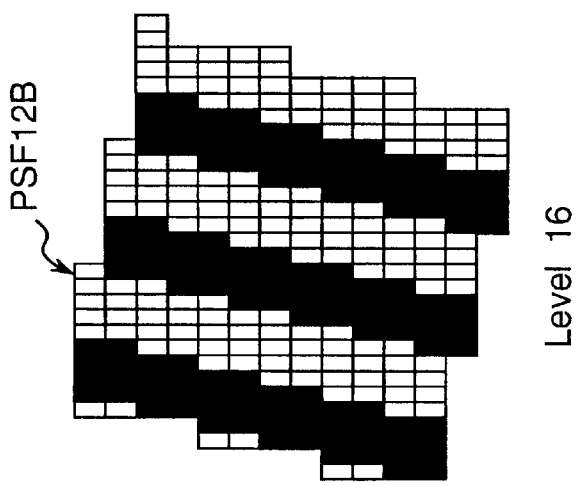
Figure 28A:
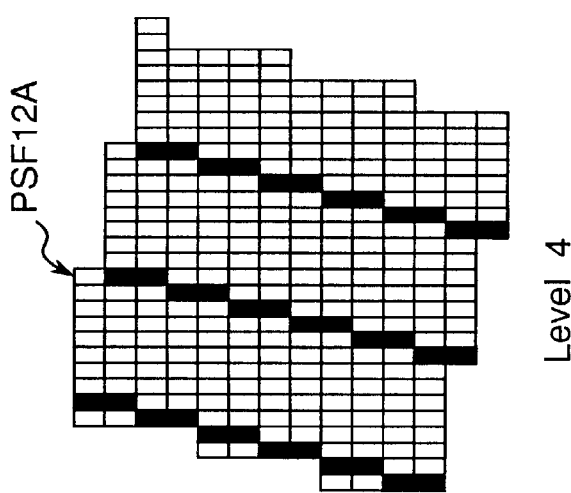
Figure 29C:
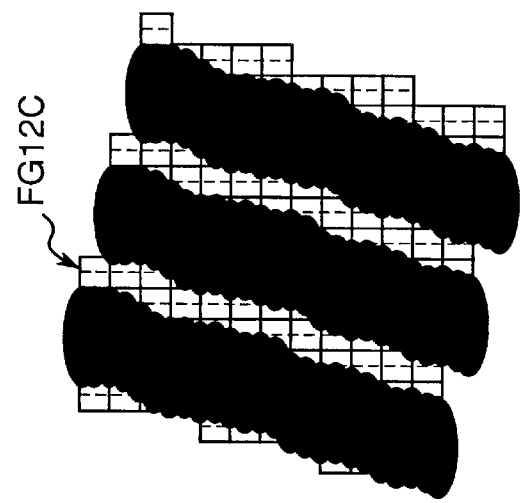
FIGS. 29A, 29B and 29C are diagrams of output images when printed by the prior art gradation pattern images of FIGS. 28A, 28B and 28C.
Figure 29B:
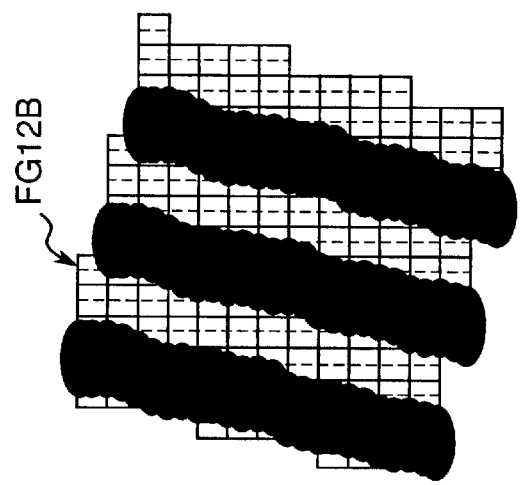
Figure 29A:
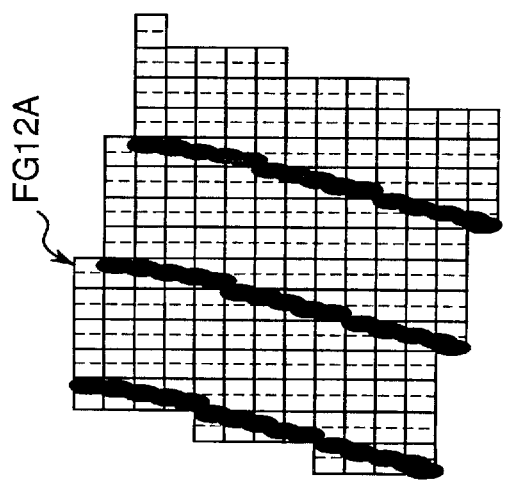

Further, the prior art output images FG11C and FG12C, shown in FIGS. 26C and 29C, obtained at high density levels by using the two gradation patterns PSG11 and PSG12 shown in FIG. 24 and FIG. 27 have blank portions connected in line shapes, and the distance between the lines is approximately constant. Therefore, due to changes in development characteristic or the photoconductor characteristic in the electrophotographic process, all the blank portions simultaneously collapse at once in some conditions, so that the gradation of the image is deteriorated. Furthermore, in the prior art output image FG11C shown in FIG. 26C, the blank portions may collapse due to a printing position displacement in the longitudinal direction (subscan direction or vertical direction) caused by pitch irregularity or the like.

In order to solve this problem, the gradation patterns PSG1 and PSG2 of the embodiment are set so that part of adjacent lines of each output image FG becomes continuous at intermediate density levels, and this prevents the blank portions from being simultaneously collapsed all at once, scarcely generating the degradation of the gradation of the image.

Further, in the output image FG1A shown in FIG. 20A obtained with the gradation pattern PSG1, the maximum inter-dot distance in the longitudinal direction can be elongated, and therefore, the blank portions scarcely collapses due to the printing position displacement in the longitudinal direction. Thus, because the gradation patterns PSG1 and PSG2 are set so that a plurality of blank portions appear discretely and periodically in the screen direction (in the line direction) at the high-density range, even if a printing position displacement occurs due to fluctuations in characteristics of the electrophotographic process or pitch irregularity or the like, instability of the output image can be reduced. As described above, by using the gradation patterns PSG1 and PSG2 shown in FIGS. 18 and 21, a color image of two color components is formed without color shift and color nonuniformity, free from texture noise, and it has stable gradation reproducibility.

Next, gradation patterns PSG for forming a full-color image with four color components will be described. By using the gradation patterns PSG1 and PSG2 shown in FIG. 18 and FIG. 21, it is allowed to make a screen angle difference of 90 degrees or to have a screen angle only in one direction by growing dots linearly.

When the prior art gradation patterns PSG is used, which grows in a dot pattern of the dot shape, only one gradation pattern image PSF can be formed with regard to "A" in Table 1. Further, when the prior art gradation patterns PSG are used, if the gradation patterns PSG corresponding to one color component are set by a combination of the parameters of "A", it is required to select the gradation patterns PSG for the remaining three color components from among "B" through "H". Therefore, by any selection, the screen angle between any two of them inevitably becomes smaller than 20 degrees.

On the contrary, by using the gradation patterns PSG1 and PSG2 of the embodiment, it is allowed to form two gradation pattern images of a line-shaped gradation pattern image PSF1A having a screen angle of 14 degrees and the line-shaped gradation pattern image PSF2A having a screen angle of 104 degrees. Therefore, it is proper to select the gradation patterns PSG1 and PSG2 for two colors out of the four color components and to select two out of "A" and "C" through "H" in Table 1 for the gradation patterns PSG3 and PSG4 for the remaining two colors. For example, by selecting the gradation patterns PSG3 and PSG4 of two colors by a combination of, for example, "E" and "H", an angle difference not smaller than 20 degrees can be set between any two of the screen angles of the four gradation pattern images PSF. Thus, in the present embodiment, two colors are allowed to have a screen angle difference of 90 degrees between them, and this provides an increased degree of freedom in selecting the screen angles of the other colors except for the two colors.

Next, various examples implemented on the basis of the contents explained above will be described with reference to following Tables 2 to 5. In Tables 2 to 5, reference characters Y, M, C and K represent the reproduction colors of yellow, magenta, cyan and black, respectively, reference characters a, b, c, $\theta_1$ and $\theta_2$ are the same as defined in FIG. 4B. The term of "dot" in the column of the pattern shape represents a gradation pattern image formed by the conventional method for generating a dot pattern, while the term of "line" in the same column represents a gradation pattern image formed with the gradation patterns PSG1 and PSG2 grown in line shapes as described above. In the examples, color images are formed by superposing gradation pattern images on one another under the conditions as shown in the Tables, and they were evaluated on color nonuniformity and texture noises. Tables 2 and 3 show color images formed by the conventional gradation reproducing method or image forming method, while Tables 4 and 5 are color images formed by the gradation reproducing method or image forming method of the embodiment.

TABLE 2

Color image formed by the conventional method

| | a | b | c | $\theta_1$ | $\theta_2$ | Pattern shape | Color nonuniformity | Texture noises |
|---|---|---|---|---|---|---|---|---|
| Y | 4 | 0 | 4 | 0° | 90° | Dot | | |
| M | 4 | 0 | 4 | 0° | 90° | Dot | Bad | Good |
| C | 4 | 0 | 4 | 0° | 90° | Dot | | |
| K | 4 | 0 | 4 | 0° | 90° | Dot | | |

TABLE 3

Color image formed by the conventional gradation method

| | a | b | c | $\theta_1$ | $\theta_2$ | Pattern shape | Color non-uniformity | Texture noise |
|---|---|---|---|---|---|---|---|---|
| Y | 4 | 0 | 4 | 0° | 90° | Dot | | |
| M | 4 | 1 | 4.12 | 14° | 104° | Dot | Bad | Good |
| C | 1 | 4 | 4.12 | 76° | 166° | Dot | | |
| K | 3 | 3 | 4.12 | 45° | 135° | Dot | | |

TABLE 4

Color image formed by the method of the embodiment

| | a | b | c | $\theta_1$ | $\theta_2$ | Pattern shape | Color non-uniformity | Texture noise |
|---|---|---|---|---|---|---|---|---|
| Y | 1 | 4 | 4.12 | 76° | 166° | Dot | | |
| M | 4 | 1 | 4.12 | 14° | | Line | Good | Good |
| C | 4 | 1 | 4.12 | 104° | | Line | | |
| K | 3 | 3 | 4.24 | 45° | 135° | Dot | | |

TABLE 5

Color image formed by the method of the embodiment

| | a | b | c | $\theta_1$ | $\theta_2$ | Pattern shape | Color non-uniformity | Texture noise |
|---|---|---|---|---|---|---|---|---|
| Y | 3 | 3 | 4.24 | 135° | | Line | | |
| M | 4 | 1 | 4.12 | 14° | | Line | Good | Good |
| C | 4 | 1 | 4.12 | 104° | | Line | | |
| K | 3 | 3 | 4.24 | 45° | | Line | | |

As is apparent from Tables 2 and 3, it can be understood that both color nonuniformity and texture noise are not satisfied by using the prior art gradation reproducing method. On the contrary, as is apparent from Tables 4 and 5, both color nonuniformity and texture noise are satisfactory by using the gradation reproducing method of the embodiment.

As described above, the present embodiment uses the two gradation patterns PSG1 and PSG2 having a screen angle difference of 90 degrees between them. Dots in the dot pattern grow in a linear shape as the gradation level increases gradually in the low-density range and a plurality of dots discretely appear on one line through the growth process. Therefore, even when the printing position is shifted, the change in overlapping area of the dots of the two colors can be eliminated, so that color shift or color nonuniformity can be suppressed.

Furthermore, the gradation pattern images PSF1 and PSF2 obtained by using the first and second gradation patterns PSG1 and PSG2 for two colors are formed in line-shaped patterns in which the screen angles are perpendicular to each other. Then, this increases the degree of freedom in setting the third and fourth gradation pattern images PSF3 and PSF4 for the remaining two colors. Then, the remaining two colors can be formed in a dot- or line-shaped gradation pattern image such that the difference in screen angle between them and the first and second line-shaped gradation pattern images PSF1 and PSF2 becomes not smaller than 20 degrees, so that texture noise can be suppressed. Thus, according to the present embodiment, a multi-color image or a full-color image free from color shift, color nonuniformity and texture noise is reproduced satisfactorily.

Though the first and second gradation pattern images PSF1 and PSF2 are formed in the line-shaped patterns of screen angles of 14 degrees and 104 degrees, respectively, the invention is not limited to this example. An angular difference of 90 degrees between the dot growth directions may be satisfied by gradation patterns PSG of the same size.

Next, other examples will be described. FIGS. 31A and 32A show gradation patterns PSG5 and PSG6 of size of 6*12, and FIGS. 31B and 32B show gradation pattern images PSF5 and PSF6 provided by them. The gradation pattern images PSF5 and PSF6 show examples for the density level of "12" of the image data. By using the gradation patterns PSG5 and PSF6, there can be obtained gradation pattern images PSF5 and PSF6 having screen angles of 135 degrees and 45 degrees, respectively.

The gradation pattern images PSF5 and PSF6 have line shapes extending in the directions of 135 degrees and 45 degrees, respectively. Although not shown, when the density level is "3", the gradation pattern images PSF have a dotted line shape continuous in the direction of 135 degrees or 45 degrees. The lines first come in contact with the adjacent lines when the density level is increased to "26", and a shape in which blank portions are scattered in the directions of 135 degrees and 45 degrees, respectively, is provided when the density level becomes not smaller than "27".

Thus, when the screen angles of the line-shaped gradation pattern images are set to 135 degrees and 45 degrees for two colors, dot-shaped gradation patterns PSG are set for the remaining two colors by selecting two from among "A", "B" and "H", or crossing gradation patterns PSG are set by selecting one from among "A", "B" and "H" in Table 1.

If a method which uses look-up tables without using any threshold value matrix such as the gradation patterns PSG is adopted, or if an output pattern (density pattern) for each density level of inputted image data is used, the same advantages can be obtained by setting two output patterns out of the four output patterns as described above.

When a full-color image is formed with three colors in the embodiment, the gradation patterns PSG1 and PSG2 are used for any two colors while the screen angle of the gradation pattern PSG3 of the other one color is made different from those of them by a value not smaller than 20 degrees. The size of the gradation patterns PSG, the arrangement of the threshold values and so on can be appropriately changed in a manner other than the above. The construction, shape, number, material and so on of all or part of the image forming section 10 or the image forming device 1 may be varied other than the aforementioned ones.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for reproducing a gradation image of a plurality of colors comprising the steps of:
    receiving multi-level image data which represents gradation levels of an image to be reproduced;
    selecting one of a plurality of patterns for a color of the received image data; and
    screening the received image data with the selected pattern to generate bi-level image data for reproducing the image with dots, wherein the patterns include a first pattern making the dots in the reproduced image grow as lines as gradation level increases, and a second pattern making the dots in the reproduced image grow as lumps as gradation level increases.

2. The method according to claim 1, wherein the dots are reproduced on a recording medium in said reproducing step and the first pattern makes the dots grow as lines extending in a direction to carry the recording medium as gradation level increases.

3. The method according to claim 1, wherein a screen angle of the first pattern is the same as that of the second pattern.

4. The method according to claim 3, wherein the patterns further include a third pattern, and a screen angle of the third pattern is different by a first angle equal to or larger than 20 degrees from that of the first and second patterns.

5. The method according to claim 4, wherein the patterns further include a fourth pattern, and a screen angle of the fourth pattern is different from that of the first and second patterns and from that of the third pattern by second and third angles equal to or larger than 20 degrees.

6. The method according to claim 5, wherein a difference of the screen angle of the first and second patterns from that of the third pattern is about 30 degrees, and a difference of the screen angle of the third pattern from that of the fourth pattern is about 30 degrees.

7. An image reproduction apparatus comprising:
    an input section receiving multi-level image data which represents gradation levels of an image to be reproduced;
    a storage device storing patterns including a first pattern making dots in a reproduced image grow as lines as gradation level increases, and a second pattern making the dots in a reproduced image grow as lumps as gradation level increases;
    a data processor selecting one of the patterns for a color of the received image data and screening the image data received by said input section with the selected pattern to generate bi-level image data; and
    an image forming section which reproduces the image with dots according to the bi-level image data obtained by said data processor.

8. The image reproduction apparatus according to claim 7, wherein the dots are reproduced on a recording medium and the first pattern makes the dots grow as lines extending in a direction to carry the recording medium as gradation level increases.

9. The image reproduction apparatus according to claim 7, wherein a screen angle of the first pattern is the same as that of the second pattern.

10. The image reproduction apparatus according to claim 9, wherein the patterns further include a third pattern, and a screen angle of the third pattern is different by a first angle equal to or larger than 20 degrees from that of the first and second patterns.

11. The image reproduction apparatus according to claim 10, wherein the patterns further include a fourth pattern, and a screen angle of the fourth pattern is different from that of the first and second patterns and from that of the third pattern by second and third angles equal to or larger than 20 degrees.

12. The image reproduction apparatus according to claim 11, wherein a difference of the screen angle of the first and second patterns from that of the third pattern is about 30 degrees, and a difference of the screen angle of the third pattern from that of the fourth pattern is about 30 degrees.

13. A storage device for storing data for access by an application program being executed by an image reproduction apparatus which reproduces a gradation image of a plurality of colors according to image data on the plurality of colors which represent gradation levels of the image reproduction apparatus, comprising data of a plurality of patterns for reproduction colors used to screen image data for conversion to bi-level dot data;
    wherein the patterns include a first pattern making dots to be reproduced grow as lines as gradation level increases, and a second pattern making dots to be reproduced grow as lumps as gradation level increases.

14. The storage device according to claim 13, wherein a screen angle of the first pattern is the same as that of the second pattern.

15. The storage device according to claim 14, wherein the patterns further include a third pattern, and a screen angle of the third pattern is different by an angle equal to or larger than 20 degrees from that of the first and second patterns.

16. The storage device according to claim 15, wherein the patterns further include a fourth pattern, and a screen angle of the fourth pattern is different from that of the first and second patterns and from that of the third pattern by second and third angles equal to or larger than 20 degrees.

17. The storage device according to claim 16, wherein a difference of the screen angle of the first and second patterns from that of the third pattern is about 30 degrees, and a difference of the screen angle of the third pattern from that of the fourth pattern is about 30 degrees.

18. A method for reproducing a gradation image, comprising the steps of:

receiving multi-level image data which represents gradation levels of an image to be reproduced; and screening the received image data with a gradation pattern to generate bi-level image data for reproducing the image with dots, wherein:

the gradation pattern makes dots to be reproduced appear discretely along lines at low gradation levels as the gradation level increases, the gradation pattern makes the discretely grown dots grow at intermediate gradation levels to form lines as the gradation level increases, and the gradation pattern makes dots appear in a direction crossing the lines at high gradation levels as the gradation level increases.

19. An image reproduction apparatus comprising:

an input section receiving multi-level image data which represents gradation levels of an image to be reproduced;

a storage device storing a pattern making dots to be reproduced appear discretely along lines at low gradation levels as the gradation level increases;

a data processor screening the image data received by said input section with the pattern to generate bi-level image data; and an image forming section which reproduces the image with dots according to the bi-level image data obtained by said data processor, wherein:

the gradation pattern makes the discretely grown dots grow at intermediate gradation levels to form lines as the gradation level increases, and the gradation pattern makes dots appear in a direction crossing the lines at high gradation levels as the gradation level increases.

20. A storage device for storing data for access by an application program being executed by an image reproduction apparatus which reproduces a gradation image according to image data which represent gradation levels of the image, comprising:

data of a pattern used to screen image data for conversion to bi-level image data, wherein:

the pattern makes dots to be reproduced grow discretely along lines at low gradation levels as the gradation level increases, the gradation pattern makes the discretely grown dots grow as lines at intermediate gradation levels as the gradation level increases, and the gradation pattern makes dots appear in a direction crossing the lines at high gradation levels as the gradation level increases.

* * * * *